United States Patent [19]

Neidell

[11] Patent Number: 4,564,841
[45] Date of Patent: Jan. 14, 1986

[54] NAVIGATIONAL SYSTEMS USING PHASE ENCODED ANGULAR COORDINATES

[76] Inventor: Norman S. Neidell, 10497 Town & Country Way Suite 300, Houston, Tex. 77024

[21] Appl. No.: 715,052

[22] Filed: Mar. 22, 1985

Related U.S. Application Data

[63] Continuation of Ser. No. 225,410, Jan. 15, 1981, abandoned, which is a continuation-in-part of Ser. No. 76,695, Sep. 18, 1979, Pat. No. 4,315,263, which is a continuation of Ser. No. 925,903, Jul. 19, 1978, which is a continuation-in-part of Ser. No. 691,674, Jun. 1, 1976, Pat. No. 4,114,153, which is a continuation of Ser. No. 483,202, Jul. 26, 1974, abandoned.

[51] Int. Cl.$^4$ ............................................. G01S 1/08
[52] U.S. Cl. .................................. 343/386; 343/453; 367/151; 367/13; 367/150
[58] Field of Search ............... 343/9 R, 385, 386, 450, 343/451, 453, 786, 771; 367/13, 150, 151; 340/850; 73/64.3

[56] References Cited

U.S. PATENT DOCUMENTS

| | | | |
|---|---|---|---|
| 2,920,320 | 1/1960 | Ross | 343/453 |
| 3,430,234 | 2/1969 | Wright. | |
| 3,534,399 | 10/1970 | Hirsch. | |
| 3,829,860 | 8/1974 | Cutler et al. | 343/9 |
| 3,941,984 | 3/1976 | Chappell et al. | |
| 3,943,514 | 3/1976 | Afendykiw et al. | 343/453 |
| 4,028,699 | 6/1977 | Stevens | 343/9 |
| 4,207,523 | 6/1980 | Acker | 371/6 |
| 4,413,331 | 11/1983 | Rowe, Jr. et al. | 367/155 |

FOREIGN PATENT DOCUMENTS 690889 4/1953 United Kingdom ................ 367/151

OTHER PUBLICATIONS

K. E. Karwarth, Journal of the Institute of Navigation, vol. 24, No. 1, pp. 105-120, Jan. 1, 1971.

*Primary Examiner*—Theodore M. Blum
*Attorney, Agent, or Firm*—Pravel, Gambrell, Hewitt & Kimball

[57] ABSTRACT

Navigation systems which position one or more mobile platforms in real time with appropriate accuracy in reference to a known system of coordinates by the emission of signals into a propagation medium and processing them after detection are disclosed. Broad-band, broad-beam signals are employed. All received signals convey phase encoded angular coordinate information which characterizes the particular signal path. Phase encoding of angular information is effected by suitably configured "lenses" of dispersive materials or by post-critical angle reflection from a suitably configured reflector and shield combination. When the angular coordinate information is used in conjuction with range determinations from detected signals, an especially useful navigation system is provided which can operate from a single reference station.

28 Claims, 13 Drawing Figures

NAVIGATIONAL SYSTEMS USING PHASE ENCODED ANGULAR COORDINATES

CROSS-REFERENCE TO RELATED APPLICATIONS

This application is a continuation of co-pending U.S. patent application Ser. No. 225,410, filed Jan. 15, 1981, now abandoned, which is a continuation-in-part of my co-pending U.S. patent application Ser. No. 076,695 filed Sept. 18, 1979, now issued as U.S. Pat. No. 4,315,263; which is a continuation of my U.S. patent application Ser. No. 925,903 filed July 19, 1978; which is a continuation-in-part of my co-pending application Ser. No. 691,674, filed June 1, 1976 issued as U.S. Pat. No. 4,114,153 on Sept. 12, 1978, which reissued as U.S. Pat. No. Re. 31,509 on Jan. 24, 1984; which was a continuation of U.S. patent application Ser. No. 483,202, filed July 26, 1974, now abandoned.

BACKGROUND OF THE INVENTION

According to Karwarth in the *Journal of the Institute of Navigation*, Vol 24, No. 1, pp. 105-120, Jan. 1, 1971, the basic objective of area navigation is to position in real time with appropriate accuracy one or more mobile platforms with reference to some known coordinate system. The number of coordinates needed depends upon whether the course of the mobile platform can be charted on a known surface or must be described in three-dimensional space as in the respective cases of a ship at sea and an aircraft. The ability to chart a course based on past, present and future desired positions in a principal element in distinguishing an area navigation system from navigation using point-to-point or "homing" approaches such as VOR/DME (VHF Omnidirectional Range/Distance Measuring Equipment).

Positions are established in all cases by signal transmission between the mobile units and at least one transmitter of known location. The transmissions can be electromagnetic (including optical) or acoustic in any medium including air. Two basic methods are normally used to obtain positions:

Positions may be determined from a sufficient number of range measurements to known reference locations by using what is commonly known as "range-range" systems, or positions may be determined from a sufficient number of range differences to known reference locations, by using what is commonly known as "hyperbolic" systems. In each case a sufficient number is at least equal to the number of coordinate values needed.

Direct ranging involves calculation of intersections of the circles or spheres of uniform range from each reference location to the mobile unit. By contrast, the locus of equal range difference from the mobile unit to a pair of reference locations are hyperbolae or hyperboloids of revolution. Again, positions are calculated by intersection of curves or surfaces, but in this case related to the hyperbolae, hence the name hyperbolic systems.

An exemplary task of area navigation might be the positioning of a ship at near shore distances. In range-range operation only two shore stations are needed while a hyperbolic system requires three. Three shore stations admit calculation of two independent range differences. As a general rule, hyperbolic systems offset a disadvantage in requiring one or more known reference location than the simpler range system by not requiring either a time standard or an active transmitter on the ship.

As for the transmitted signals, a variety of differing modes of operation are possible. Ranges can be determined from signal transmission time between the mobile unit and a reference location if the signal initiation time is known, a time standard is available, and a signal propagation velocity is also known. The simplest means for establishing known initiation times is to transmit signals only in response to some interrogation. Alternatively, if transmissions are synchronized to occur at regular time intervals, time differences are readily determined, with no interrogation step needed, using only a local clock and a propagation velocity.

Again, signal transmissions themselves can consist of continuous waveforms (typically sinusoids), intervals of continuous signal transmissions, or sequences of pulses. The choice of transmitted signal reflects consideration of the information desired, mode of operation (range-range versus hyperbolic), noise effects, and the extent of Doppler distortions among other factors.

Continuous waveforms are the most robust signals in the presence of noise backgrounds since correlation-type receivers may take advantage of the extreme signal duration. Such signals have no resolution in time and are used principally with hyperbolic systems to establish time-differences by making phase comparisons with reference signals. Where the transmitter-receiver relative velocity is not insignificant in proportion to the signal propagation velocity, Doppler effects shift the frequencies of continuous waveforms. Frequency shifts may be viewed as errors since they distort subsequent correlation steps and thus degrade phase comparisons; however, if such shifts are measured, they do relate to velocity information should this be desired.

Use of continuous signals over intervals provides time resolution as well as opportunities for correlation detection, but over shorter data windows. Again, any Doppler effects may be viewed either as constituting an error in range determination or if measured, velocity information. The tolerance of such signals to noise effects is of course diminished in direct relation to their shortened duration.

In the limit, as duration is shortened, pulsed signals must be considered which when taken individually offer no opportunity to measure Doppler effects. Hence significant transmitter-receiver relative velocities will be noted as range errors for such systems. These signals are also most affected by the presence of noise, but afford the greatest resolution in making a direct time measurement.

It follows that the alternative methods of operation that exist constitute attempts at optimizing a number of trade-offs which interact with some complexity. The hardware requirement, operations costs, efficiencies and effectiveness in terms of achievable accuracy are all essential ingredients that play roles in the optimization. Navigation systems based on the present invention may generally serve as replacements for such systems and others.

The present invention involves the application of dispersion to signal phase. The phenomenon of dispersion is well known in optics. By way of an appropriate background regarding this principle in order to understand its application to the present invention, an appropriate definition of dispersion, a presentation of the distinguishing characteristics of normal and anomalous dispersion, and a description of various embodiments of dispersion may be found in Sommerfeld, *Mechanics of Deformable Bodies,* Academic Press, New York 396 p, 1950 (see in particular pp. 172–206, 2nd printing 1956), and Longhurst, *Geometrical and Physical Optics,* Longman, 592 p, 2nd Edition, 1967 (see in particular p. 452 and FIG. 20-4).

It is necessary to distinguish also the phase-angle rotation undergone by a signal in traveling through a dispersive medium or in post-critical angle reflection from a mere time delay. If the angular frequencies contained within the spectrum of a signal having bandwidth range from a value $\omega_1$ to a greater value $\omega_2$, the phase spectrum of the signal over that range will be some function $f(\omega)$, $\omega_1 \leq |\omega| \leq \omega_2$. After traveling through a dispersive medium the change in phase of the signal, which characterizes the degree of dispersion, can be described in first approximation by $\Delta f(\omega) = \theta_1 + \theta_2 \omega$ where $\theta_1$ and $\theta_2$ are constants which depend only on the medium and the distance travelled within the medium.

The value of the constant $\theta_2$ describes the delay of the signal, that is, it is the increment of time that the signal has undergone in traveling through the medium of simply the signal travel time. The phase angle rotation is given by the value of the constant $\theta_1$. Because phase is an angular measure, two signals of like amplitude spectra whose phase spectra differ by an integral multiple of $2\pi$ are identical and hence indistinguishable. It is therefore customary to replace any value of $\theta_1$ that is equal to or greater than $2\pi$ by the residue of $\theta_1$ modulo $2\pi$ or in common terminology by the remainder after dividing $\theta_1$ by $2\pi$. Values of $\theta_1$ modulo $2\pi$ other than 0 and $\pi$ correspond to changes in the signal shape.

SUMMARY OF THE INVENTION

This invention relates to navigation systems for mobile platforms that ascertain phase encoded angular coordinate information in propagated signals. Certain of the signal processing techniques used for this invention may conveniently employ the methods described in my above referenced U.S. patent, which is incorporated herein by reference.

Component signal trains of constituent signals convey all of the navigational information. The component signals which may be concurrently propagating are always separable and distinguishable from one another by some combination of frequency content, polarization character, and constituent signal pattern. Member signals formed after reception and preliminary processing are made up from base signals which are required in accordance with the present invention to have four basic properties to be discussed below.

Broad-beam, broad-band transmitters produce component signals which illuminate the navigation area. Broad-beam, broad-band receivers detect these signals. Angular coordinate information is phase encoded in constituent signals by reflective or transmissive mechanisms. All encodings can be substantially characterized by an additive increment to the phase angle consisting of a constant and a second complementary constant which multiplies the frequency. This approximation to the phase effect of dispersion is essentially the first two terms of a Taylor series developed over frequency, the independent variable. In effect, the shape of a constituent signal is changed by encoding a distinction in phase in accordance with the angular coordinate information.

Angular coordinates are referred either to receiver or transmitter locations, and either the receiver or the transmitter can constitute the known location, depending on the particular embodiment. Component signal transmissions can be sent in response to interrogation, at regular time intervals or at random, depending on the selected mode of operation. In all cases the angular coordinate information will be conveyed by the distinction in phase which changes the signal shape.

Processing the received component signals to identify constituent signals may be described after formation of member signals by a phase-invariant quadrature-matched-filtering operation which is described in my above-referenced patent. Member signal basic properties and processing of the received component signals are complementary in that frequency shifts resulting from relative motion between the transmitter and receiver affect neither the arrival-time measurements nor the phase-encoded angular coordinate information. The processing includes measurement of member signal phase and a decoding from the measured phase of the encoded angular coordinate information.

Radial/relative velocity components or relative velocity information between mobile platforms and a known location and radial range or distance information may also be conveyed by the component signals. Such determinations are possible if the initial time interval between constituent signals, the initiation times of constituent signal transmissions, the signal propagation velocity in the medium, and a time standard are known or predetermined. Having both range and angular coordinate information allows development of a navigation system which can operate using only a single base station.

Since utilization of phase information is an important feature of the invention, several corrections to compensate for phase distortions are included. Distortions accompanying member signal design and entering during processing are some which fall in this category.

The broad beam nature of the transmitters used in this invention suggests lower signal energy levels in any particular direction that might be achieved with a narrow beam system. Rapid repetition of these broad beam signals can however overcome an energy-level deficit.

Further, the ability to impart angular coordinate information offers opportunities to overcome ambiguities of skywave reflections in electromagnetic embodiments and multipath reflections in sonar application.

By encoding sufficient redundancy in the constituent signals, any phase distortions imparted by the propagation medium may be measured as a part of the decoding operation. This feature adds significantly to the present invention. The phase distortion for sound waves caused by propagation in water for frequencies in the vicinity of 1.2 mhz is characterized as a function of the propagation path length by the methods of this invention.

DETAILED DESCRIPTION OF THE INVENTION

Figure 1:
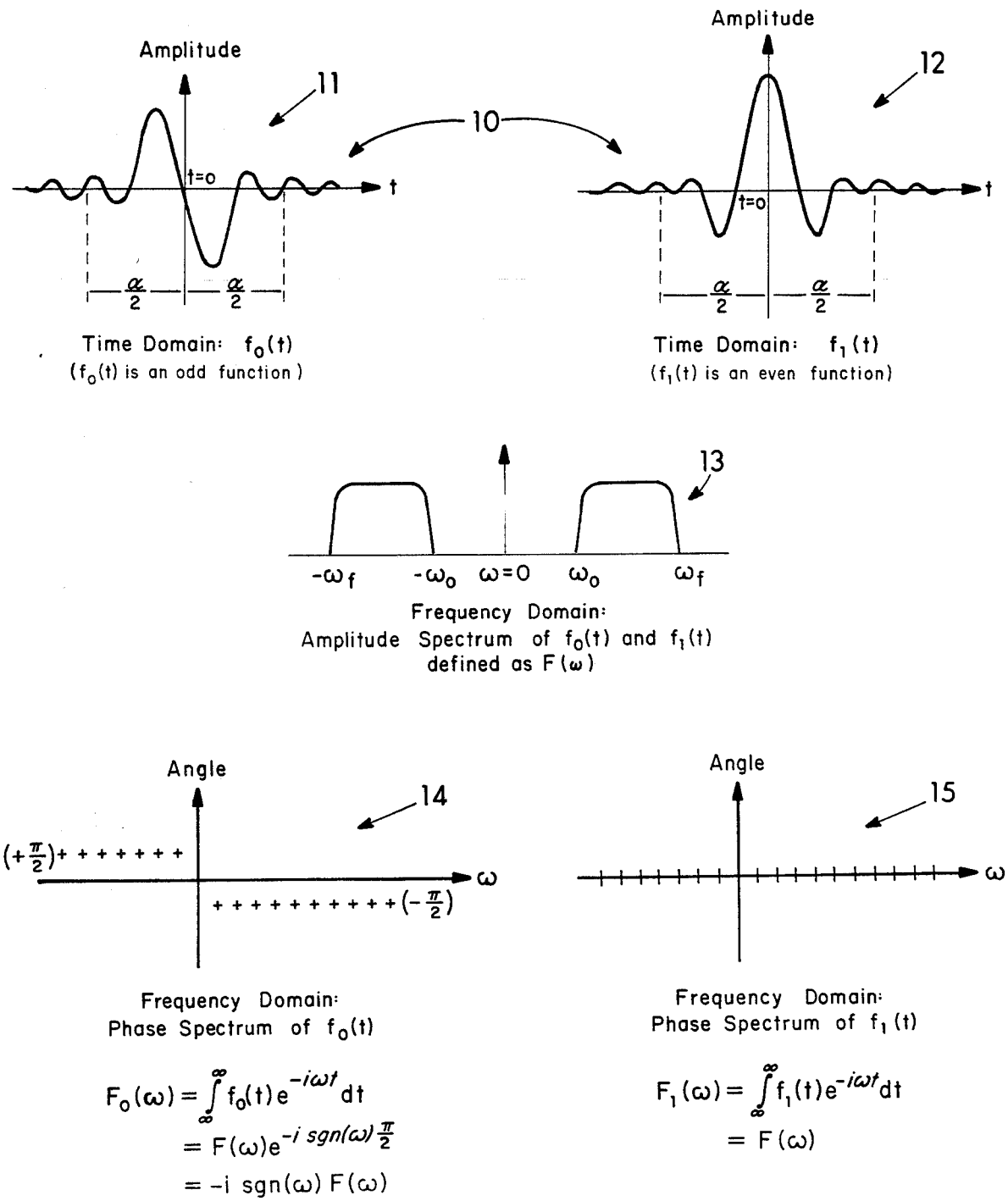
FIG. 1 shows the time and frequency domain properties of a design base signal pair having respectively odd and even symmetry.

FIG. 1 shows a pair 10 of base signals 11, 12 from which a member signal may be designated. A single member signal is formed as a linear combination of a pair of base signals as defined in applicant's referenced patents. In mathematical terms this signal f(t) may be defined:

$$f(t) = m f_0(t) + n f_1(t), \tag{1}$$

where m and n are constants obeying the relationship $m^2 + n^2 = 1$, and $f_0(t)$, $f_1(t)$ represent the base signals.

The four requisite properties I–IV of the base signals $f_0(t)$ and $f_1(t)$ are:

I. $f_0(t)$ and $f_1(t)$ share the common amplitude spectrum $F(\omega)$ 13 which is substantially flat or smoothly unimodal over both its continuous bands at positive and negative frequencies and is essentially zero elsewhere.

II. There is a finite time interval of duration $\alpha$, before and after which both $f_0(t)$ and $f_1(t)$ may be considered to be zero, in other words $f_0(t)$ and $f_1(t)$ are pulses.

III. $f_0(t)$ and $f_1(t)$ are in quadrature or constitute a Hilbert transform pair. In other words, at each common frequency component the signals differ in phase by ninety degrees.

IV. $f_0(t)$ and $f_1(t)$ must be transformable to odd and even functions respectively about $t=o$, defined as the central coordinate value in their interval of definition of duration $\alpha$, by a constant phase shift applied to all frequencies.

Signals termed Klauder signals and Gabor signals described in applicant's referenced patent are in fact representative types of signals appropriate for use as the base signals $f_0(t)$ and $f_1(t)$. Mathematically these two signal types are defined as:

Klauder Signals $k_0(t)$, $k_1(t)$ (2A)

$$k_0(t) = A \frac{\cos \omega_f t - \cos \omega_o t}{(\omega_f - \omega_o)t}$$

-continued $$k_1(t) = A \frac{\sin \omega_f t - \sin \omega_o t}{(\omega_f - \omega_o)t}$$

$\omega_o$, $\omega_f$ and A are constants, and $k_0(t) = k_1(t) = o$ for $|t| \geq \alpha$ Gabor Signals $g_0(t)$, $g_1(t)$ (2B)

$$g_0(t) = A \frac{\frac{t}{t_o}}{1 + \frac{t^2}{t_o}} \tag{2B}$$

$$g_1(t) = A \frac{1}{1 + \frac{t^2}{t_o}}$$

$t_o$ and A are constants, and $g_0(t) = g_1(t) = 0$ for $|t| \geq \alpha/2$

Figure 12:
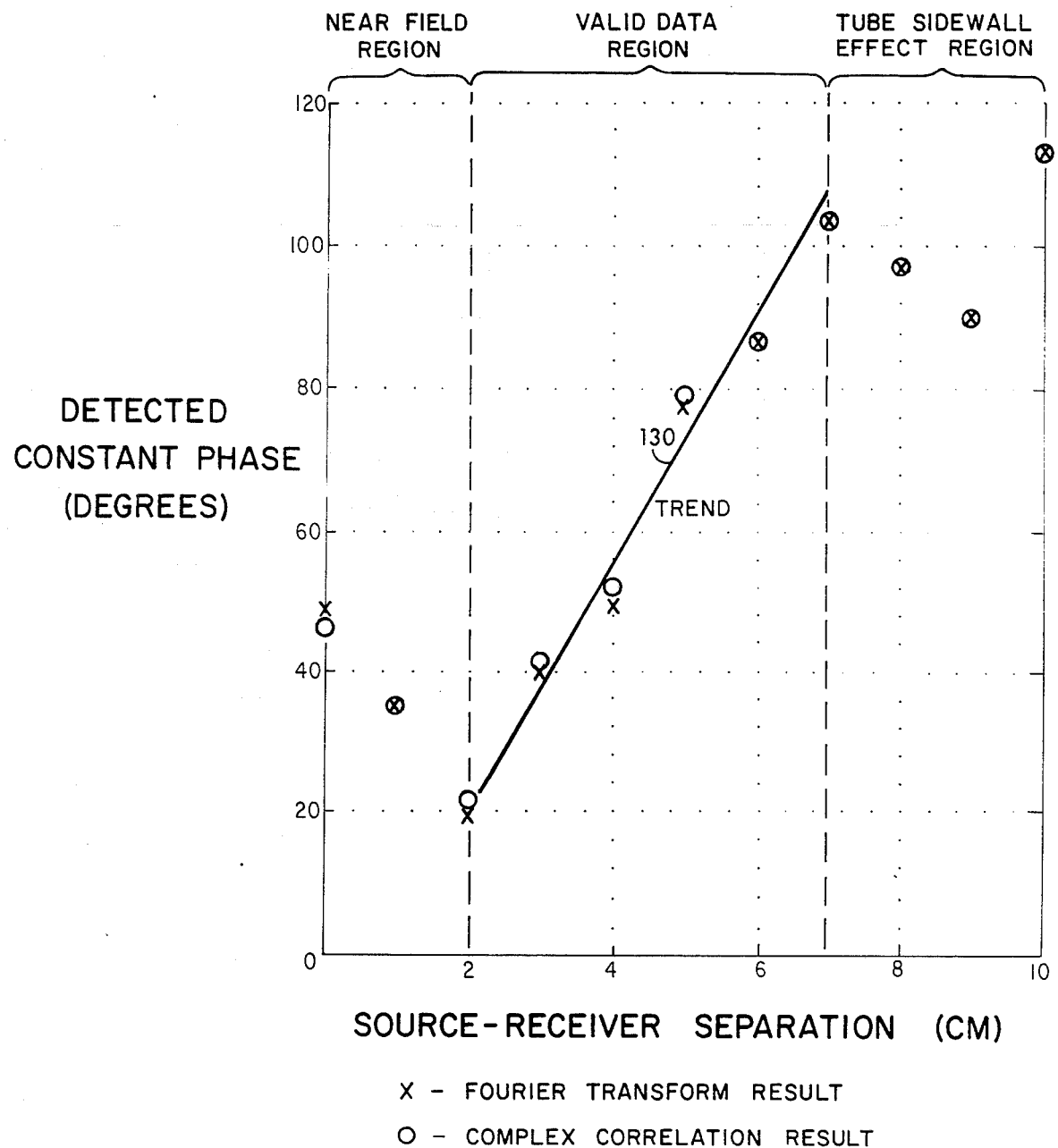
FIG. 12 shows experimental results indicating the relationship of the phase distortion of member signals at 1.2 mhz with their propagation distance through water.

Returning now to FIG. 1 (which corresponds to FIG. 12 of my referenced U.S. Pat. No. 4,114,153, now reissued as U.S. Pat. No. Re. 31,509), there is shown a diagram of the time domain (10) and Fourier frequency domain (14, 15) properties of the Klauder base signal pair termed $f_0(t)$, $f_1(t)$ (refer to Equation (2A)) which illustrate the four requisite properties (I through IV) for base signals.

It is important to recognize that any signal which occupies a band of contiguous frequencies having no frequency missing over the defined bandwidth, or a signal which has frequency bandwidth, can be simply transformed in character to that of a member signal by a linear filtering operation. As a member signal it will have a structure as described in terms of a base signal pair. The filters described by Wiener in *Extrapolation, Interpolation and Smoothing of Stationary Time Series*, M.I.T. Press, Cambridge, 1949, are particularly suited to such task. Hence any signals having frequency bandwidth may be employed in the manner of this invention by including as a step in the processor a transformation of that signal to member signal character.

For clarity of presentation the embodiments included herein will be described in terms of signal transmissions having the form of member signals. It will be readily understood by those skilled in the art that each embodiment may employ appropriate signals of more general nature by providing a suitable linear filter operation step in the processor.

Figure 2:
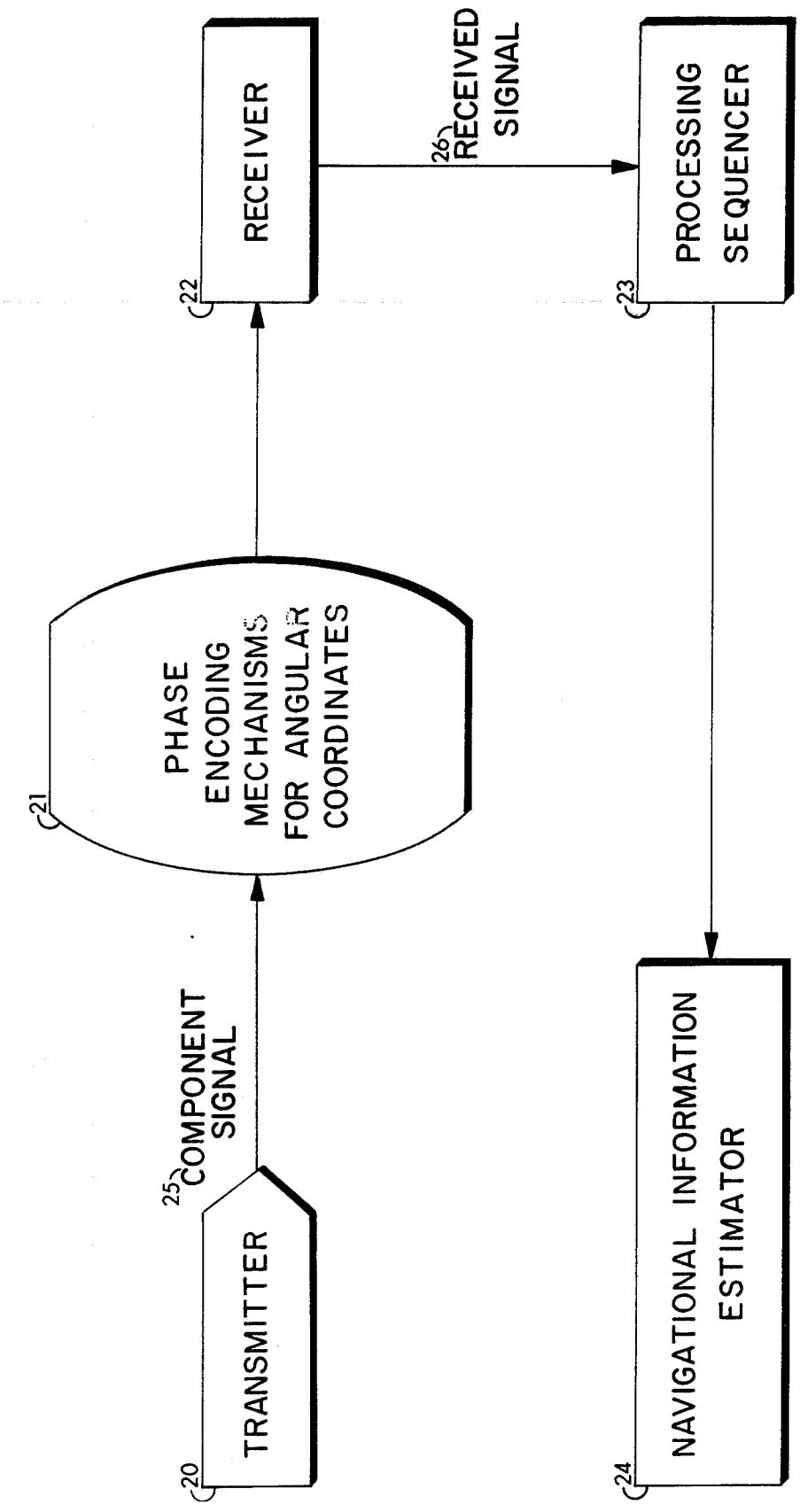
FIG. 2 shows schematically a generalized embodiment of the invention having a single transmitter and receiver.

FIG. 2 shows a generalized embodiment of the invention which employs a single transmitter 20 and receiver 22. The transmitter 20 produces at least one component signal 25. A component signal is a train of member signals which is always separable and distinguishable from other component signals by some preselected combination of frequency content, polarization character and member signal pattern. In cases such as for sonar signals where the polarization character is alike for all signals, the polarization character drops out as a possible distinguishing feature. A discussion on polarization character or state is presented by A. S. Marathay in Optical Engineering, Vol. 15, No. 4, p. SR 80-81, July-August, 1976.

For the navigation system of FIG. 2, it is required that a transmitted component signal 25 be received directly, but that somewhere along the propagation path a mechanism interacting with the signal phase be encountered. Such an element can be a phase lens or phase encoding mechanism. Element 21 performs this function. Component signal 25 which propagates with known velocity encounters phase encoding mechanism 21 and is subsequently received by receiver 22. The received component signal 26 is forwarded to the processing sequencer 23 and processing outputs are sent on to the navigational information estimator 24.

The role of the phase encoding mechanism 21 is to encode in each member signal information about one or more angular coordinates as a phase distinction. Also, the phase distinction for each angular coordinate must be unambiguously related to that coordinate. Further, the phase distinction over the applicable frequency band for any given value of the angular coordinate must be representable in good approximation by:

$$G(\omega) = \theta_o + \theta_1 \omega \quad (3)$$

where, $\theta_o$ is constant phase, $\theta_1$ is a complementary constant multiplying the angular frequency $\omega$.
$\theta_o$, $\theta_1$ are functions of the angular coordinate thus making $G(\omega)$ a function of the angular coordinate. The code for the angular coordinate is contained in the explicit relation between the coordinate and $G(\omega)$.

Property I as given earlier for the underlying base signals must be substantially retained even after the action of the phase encoding mechanism 21. Equation (3) will be recognized as comprising the first two terms of a Taylor series expansion. Hence the character of this approximation is based upon development of the received member signal phase spectrum as a Taylor series with truncation of the series after the second term. For the $i^{th}$ member signal of a component signal, the following notation will be used:

$$\theta_{io} + \theta_{i1} \omega$$

to approximate the measured phase.

Figure 3:
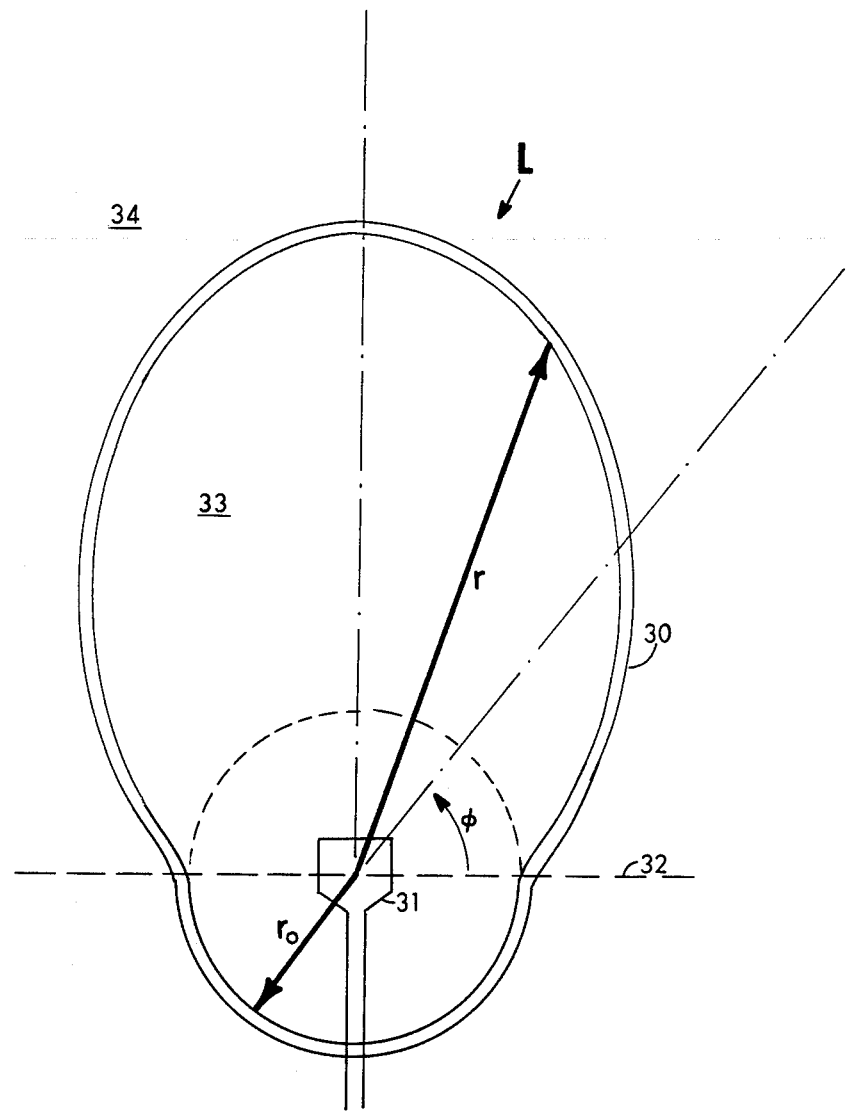
FIG. 3 shows a section view of a phase lens which encodes directional information by transmission of the signal through a dispersive material whose thickness varies with the direction which is to be encoded.

A presently preferred embodiment of a phase lens L for phase encoding of angular coordinate information according to the present invention employs the dispersive properties of a suitable material. In this embodiment (FIG. 3) a transducer 31 is placed at the center of a spherical volume of radius 3.5 cm in a shell 30. The shell 30 is formed in part by a lower portion of this spherical volume which also acts as a reference surface for the other portions of the lens L. FIG. 3 shows a section view of a rigid shell 30 filled with oil which surrounds the transducer 31, the transducer 31 being rigidly positioned with respect to shell 30. A suitable acoustically transparent material for fabricating the shell 30 is an epoxy resin, as for example, GEC-500 Nema Grade G-10 Glass epoxy which is manufactured by the Synthane-Taylor Corp. in LaVerne, Calif.

The entire apparatus L is immersed in the transmission medium 34, for example water. Alternatively the portion of the lens L for which $\phi$, the elevation angle, is negative with respect to a horizontal plane 32 may be outside the medium, for example below the bottom of the body of water 34. It is also to be understood that lens L may be directed downward below a free surface instead of upward as shown.

If we take the radius of the portion of shell 30 below plane 32 or $r_o = 3.5$ cm, then the configuration of shell 30 is specified by the mathematical relations:

$$\begin{aligned} r &= r_o & o &\geq \phi \geq = \frac{1}{2} \\ r &= r_o + c\phi & o &< \phi \leq \pi/2 \\ r &= r_o + c(\pi - \phi) & \pi/2 &\leq \phi \leq \pi \end{aligned}$$

where $\phi$ is the elevation angle measured counterclockwise and upward from the horizontal plane 32 in the plane of the section depicted in FIG. 3 and c is a constant. An appropriate value for c if $\phi$ is measured in radians may be taken equal to $60/\pi$. Hence for $\phi$ values negative and less than $\pi$ radians, the outgoing signal will suffer some small but constant dispersive phase distortion independent of $\phi$. When $\phi$ is positive however, the degree of dispersion and so the dispersive phase effect will depend on $\phi$. All horizontal sections of shell 30 parallel to the horizontal plane 32 will be circular thus eliminating any dependence of the dispersive phase distortion on an azimuth angle measured in the horizontal plane.

Phase encoding a distinction in phase with lens L in accordance with the angular coordinate or equivalently a direction in the presently preferred embodiment as illustrated by an acoustic system can be practiced by emitting a signal of Klauder form $k_1(t)$ (Equation (2A) or $f_1(t)$) as in FIG. 1 in seawater. For engineering considerations seawater velocity will be accepted as being 1500 m/sec. (Press, "Seismic Velocities," Chapt. 9, *Handbook of Physical Constants* Revised Edition, Geol. Soc. of America, Memoir 97, 1966) and its Q value describing dispersion as 62,800 (Bradley and Fort, "Internal Friction in Rocks" Chapt. 8, *Handbook of Physical Constants*—Revised Edition, Geol. Soc. of America, Memoir 97, 1966), Q being related to $200\pi$ divided by the percent energy—loss per cycle. The selected acoustic velocity is dependent on salinity and temperature. Similarly, while the Q value specified above has been measured at 150 khz, the large magnitude suggests that at substantially lower frequencies seawater will remain essentially non-dispersive.

An Interocean Systems, Inc., Model T111 transducer is representive of a number of commonly available devices that may be employed as transducer 31 to produce a signal as required in the exemplary frequency band from 2000–8000 Hz. The transducer 31 may be driven by a signal generator whose output is appropriately impedance-matched to the transducer character. It is to be noted that the autocorrelation of a swept-frequency or "chirp" signal approximates the Klauder waveform $k_1(t)$ and hence may be usefully employed for driving the transducer.

A Gould Clevite CH-1 omni-directional hydrophone may, for example, be employed for signal detection when supplied with standard preamplifiers and fittings. Many of the hydrophones customarily used in seismic exploration may also be used.

A calibration step may be employed to establish the encoding properties of the lens. Calibration uses a hydrophone at known distances from the center of transducer 31 over a variety of positive $\phi$ values to receive signals. The received signals may then be processed in the manner to be described herein and also in my referenced patent. This processing establishes both the time-delay of the dispersion, if any exists, and values of constant phase rotations independent of frequency. By such means the phase modulation properties of the lens L may be characterized by an expression of the form $\theta_1 + \theta_2\omega$ as described hereinabove.

It is important to note two points from the calibration step. First, if the constant phase rotation over frequency does not vary sufficiently in magnitude over the range $o < \phi \leq \pi/2$, or else varies so as to impart some ambiguity in relating $\phi$ to such constant quantity, it may be necessary to redesign the lens in one or more manners to correct the situation. For example, the constant c governing the lens dimension may be decreased or increased according to the nature of the redesign. Also, if the rate of phase change as a function of $\phi$ is insufficient to produce the desired angular resolution, an increased phase change rate may be obtained by use of a more highly dispersive oil or by increasing the value of c or both.

If the phase change over the ninety degrees range of $\phi$ equals or exceeds one hundred eighty degrees an ambiguity is produced. The proper course of action is to reduce the value of constant c or use less dispersive oil or both. Further, any linear phase shift or linear term in $\omega$ as embodied by the constant $\theta_2$ must be removed in the form of a correction to the arrival time of the signals.

Figure 4:
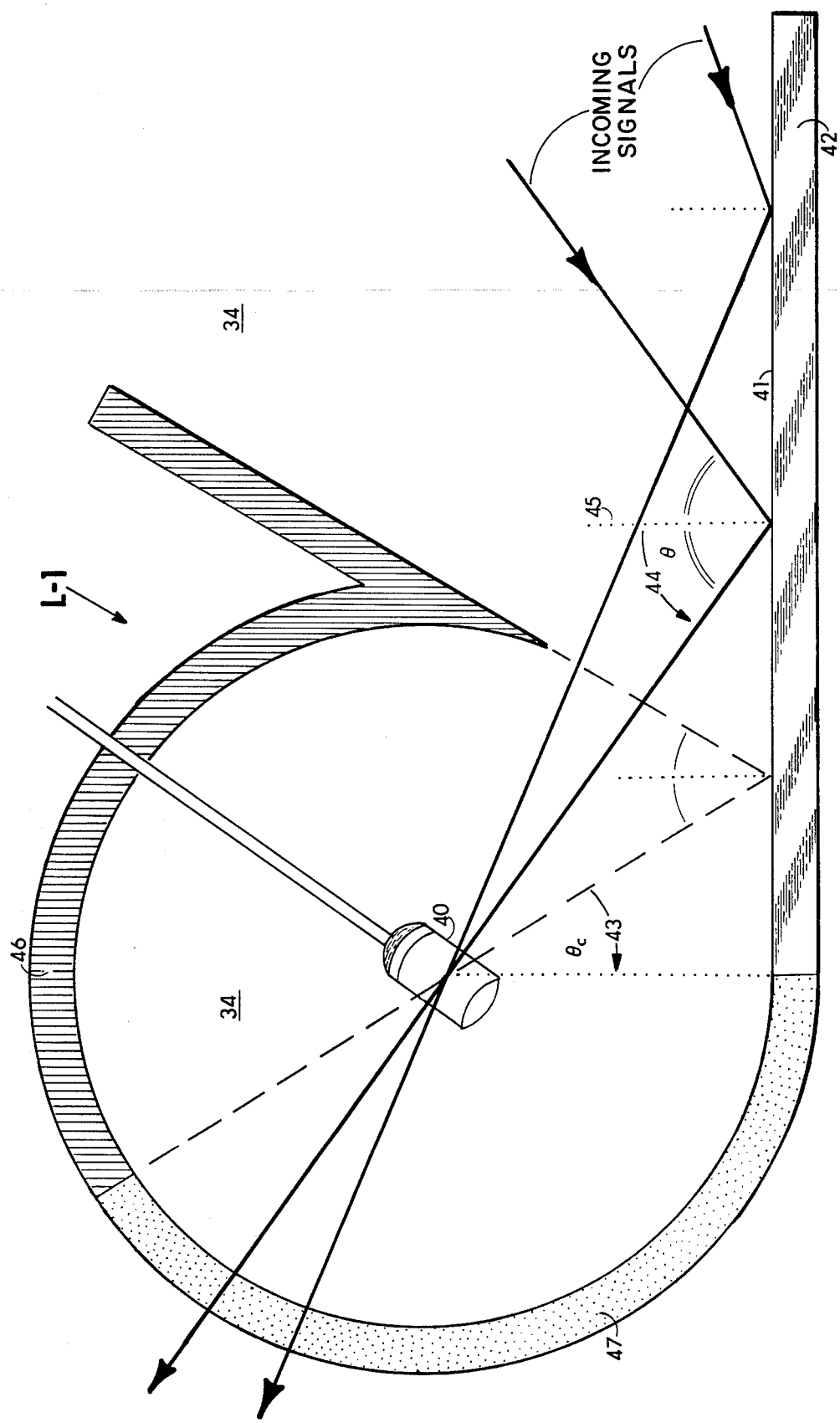
FIG. 4 shows a phase lens for dispersive encoding of directional information using post-critical angle reflection.

An alternative phase lens means L-1 of phase encoding direction according to the principles of the invention is illustrated in FIG. 4 wherein a hydrophone 40 of the type set forth previously is positioned such that it detects only post-critical angle reflections from a surface 41 of a rolled lead reflector 42 over a 40° planar sector. In this illustrative example the velocity of sound in water is taken to be 1500 m/sec. while the velocity of sound in lead is taken to be 1960 m/sec. (Press, "Seismic Velocities," Chapt. 9,*Handbook of Physical Constants*—Revised Edition, Geol. Soc. of America, Memoir 97, 1966 and *Handbook of Chemistry and Physics,* 51st Edition P E-41, Chemical Rubber Company, 1970–71). Accordingly, the critical angle is slightly less than 50°.

The physical principles underlying the phase behavior of signals reflected beyond the critical angle are described for a fluid-fluid interface by Ewing, Jardetsky and Press, *Elastic Waves in Layered Media,* McGraw Hill, 380 p. 1957 (see in particular 3-2), and Arons and Yennie, "Phase Distortion of Acoustic Pulses Obliquely Reflected from a Medium of Higher Sound Velocity," JASA, Vol. 22, pp. 231–237, 1950. In going from the critical angle $\theta_c$ to 90°, as measured by a reflection angle 44 having a value $\theta$ from the normal 45 to the reflecting surface 41, the constant phase increment, which is independent of frequency, varies from 0° to 180°. For materials which support shear waves the post-critical angle reflective behavior can be rather complex, however the behavior at the interface between water 34 and rolled lead 42 is essentially like a fluid-fluid boundary. A computation as described by Cerveny and Revindra in *Theory of Seismic Head Waves,* University of Toronto Press, 1971 (see p. 63–64) makes the relationship evident.

The phase lens depicted in FIG. 4 is designed for use in a single plane and shield material 46 is a high-velocity, high-density reflective material such as steel whose purpose is to shield hydrophone 40 from signals outside the sector of interest. By the same token an acoustically transparent material 47, which may be an epoxy resin of the type in the apparatus of FIG. 3, completes the structure and allows signals to pass on after detection without causing interfering echos. The whole apparatus of FIG. 4 may be contained in a cylinder 0.5 m in diameter and 0.1 m in height or thickness.

Calibration of the lens apparatus L-1 is done in substantially the same manner as that for the apparatus of FIG. 3. Directional or angular coordinate information is encoded onto an incoming signal by the lens L-1 prior to detection by the hydrophone 40. The constant phase increment to be calculated in the processing sequence gives the directional information. It is to be noted particularly that the phase incrementation properties in this case are exactly described by a constant term $\theta_1$ independent of frequency and a time delay or term linear in frequency representing only the reflection process prior to detection. All higher order terms of the Taylor expansion are in fact zero.

The phase lens of FIG. 3 described phase encoding in outgoing signals whereas the embodiment of FIG. 4 illustrated encoding in the received signals. In both cases the encoding enabled the apparatus to make distinctions among signals based upon directon. It should be apparent to those skilled in the signaling arts that the apparatus of FIG. 3 can be used with a receiver rather than a transmitter, while the apparatus of FIG. 4 will function with a transmitter instead of a receiver. Such interchanges of transducers will not alter the operation of the principles of this invention in distinguishing directional coordinates.

Figure 5:
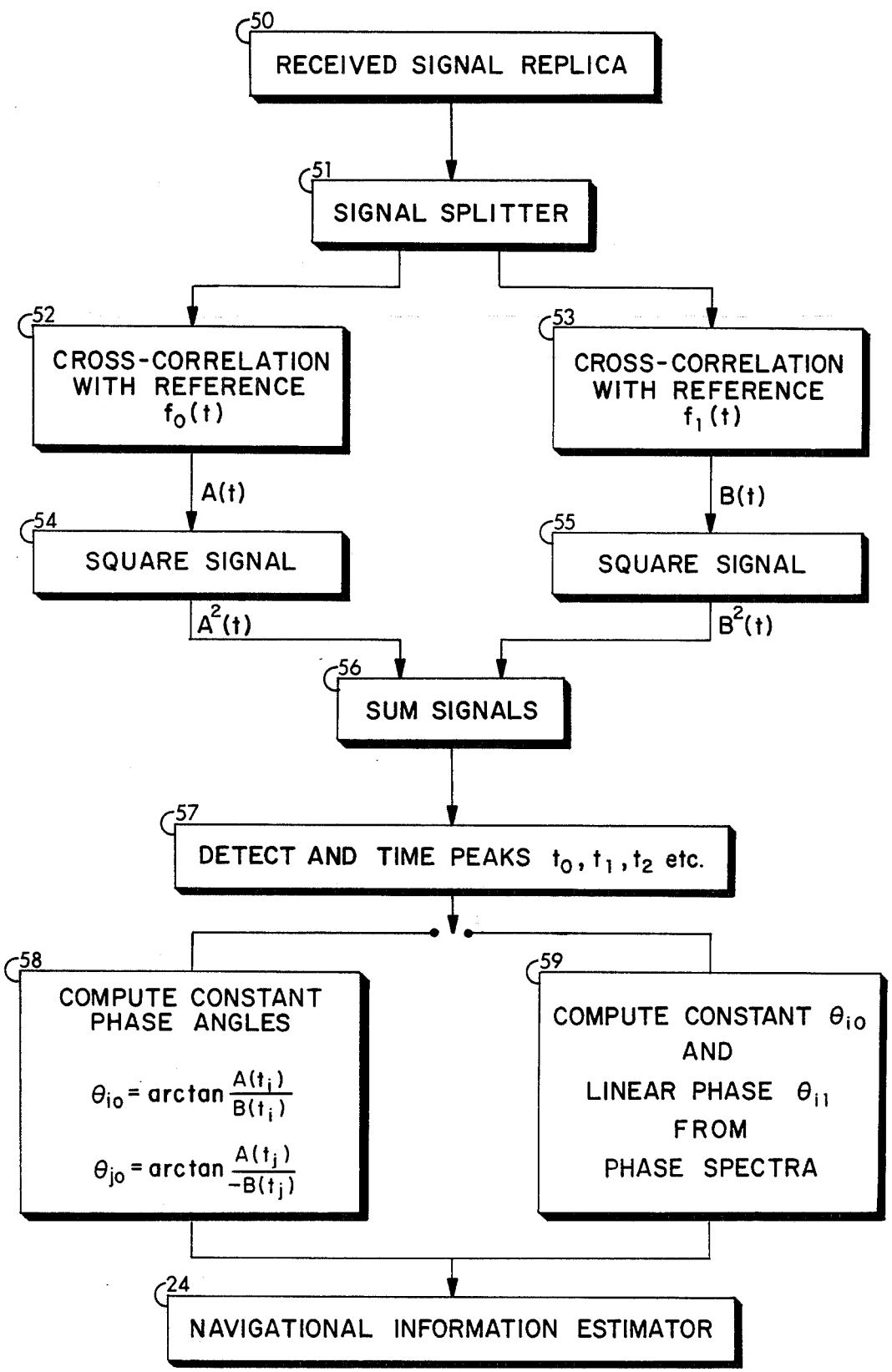
FIG. 5 shows a processing sequence for the embodiment of FIG. 2.

The navigational information for the generalized embodiment of FIG. 2 can be recovered by processing the received component signal 26 through the processing sequencer 23 which is shown in detail in FIG. 5. In FIG. 5 each member signal of the pattern within each component signal must be identified and timed. The mathematical analysis of the operational sequence is given in my referenced patent. Such analysis describes how basic properties I through IV enable individual member signals to be identified and correctly retain arrival time and phase encoded angular coordinate information in spite of appreciable distortions which may be present owning to relative motion between the transmitter and receiver. Also, a phase-invariant quadrature matched-filter processing sequencer employing analogously designed signals was described by Speiser and Whitehouse at a symposium on Spread Spectrum Communications held at the Naval Electronics Laboratory Center, San Diego, Mar. 13–16, 1973.

Member signals are identified for each of the significant peaks detected by element 57. Arrival times can be computed for each member signal with the use of a time standard, however, signal transmission times only can be determined if the signal initiation times are distinct and known. The phases of the member signals can be computed using the alternatives represented by elements 58 and 59. If the method using arctangents of ratios by element 58 is elected, then if more than single member signal is involved, these must be in quadrature. Again, the applicable signal processing is given in my referenced patent.

Figure 6:
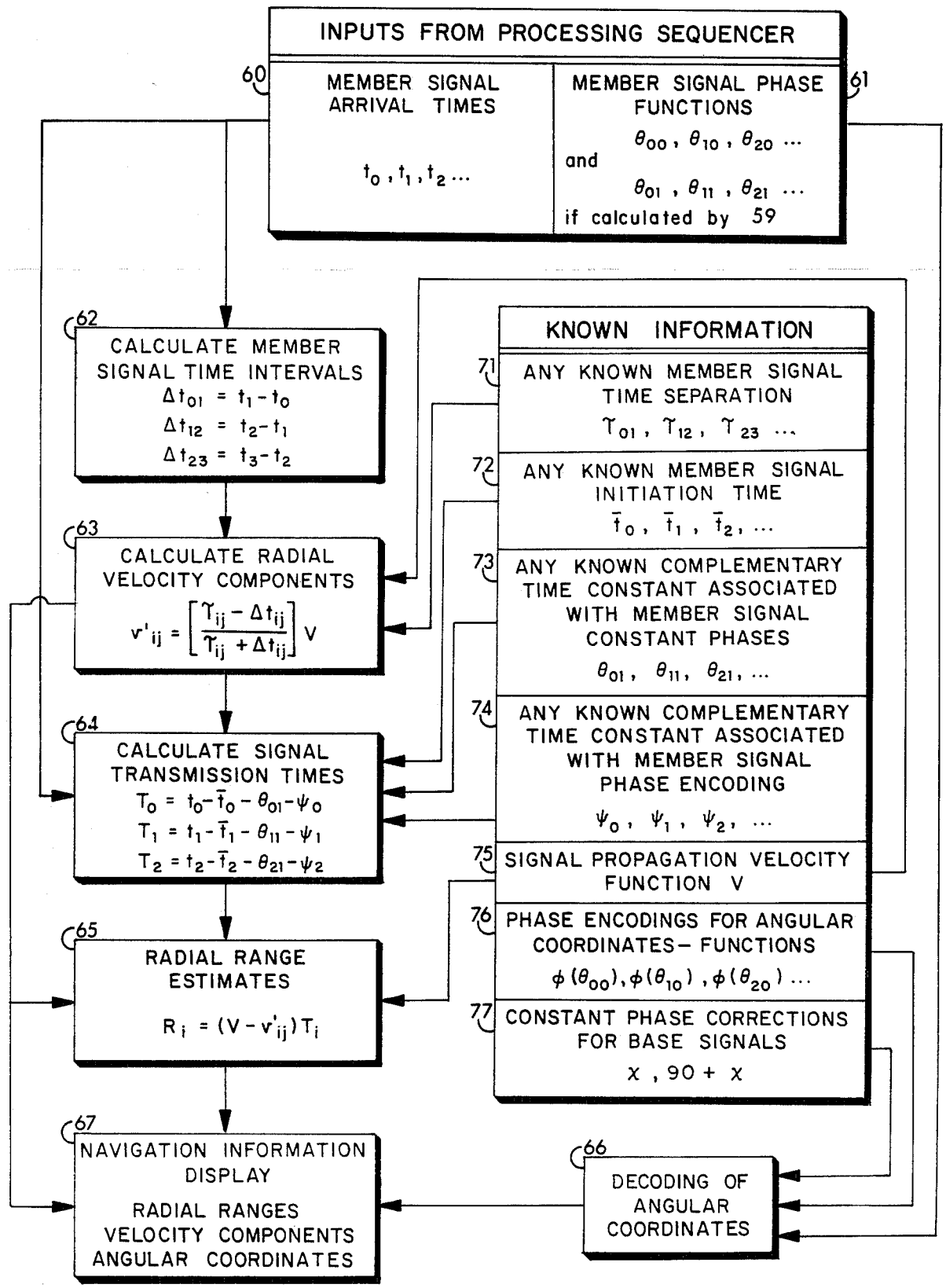
FIG. 6 shows the sequence of operations of the navigational information estimator of FIG. 5.

The navigational information estimator 24 of FIGS. 2 and 5 is outlined in detail in FIG. 6. In both FIGS. 5 and 6, a subscript, or the first subscript of a doubly subscripted quantity refers to the number of an individual member signal of the pattern within a component signal. Processing sequencer outputs 60 and 61 are both arrival times $t_i$ for the member signals and their phase functions. Since the two term Taylor expansion will be taken to approximate the phase functions, these quantities will consist of either the constant terms $\theta_{io}$ if the calculation of 58 is used, or both $\theta_{io}$ and $\theta_{i1}$, if the alternative 59 is selected. The constants are complementary in that should the $\theta_{i1}$ not be determined as in the calculation of 58, they will nevertheless be known by prior measurement or theoretical calculation and so can be supplied by alternate means should this be required.

Element 62 of FIG. 6 calculates member signal interval times. If interval times 71 are initially predetermined then in conjunction with the signal propagation velocity V of the medium 75, radial relative velocity components can be calculated according to element 63. Signal transmission times can be computed from the member signal arrival times $t_i$ as in element 64 if member signal initiation times 72 are known. Such transmission time is corrected as indicated for phase terms linearly varying with frequency (elements 73, 74). Among such correction terms would be $\theta_{i1}$ which are either measured or complementary known terms as previously discussed, and any linear phase terms of the encodings.

Radial range estimates between transmitter and receiver can be made according to element 65 using any computed signal transmission time $T_i$ (from element 64) and correcting for the signal propagation velocity in the medium. Provision is made in 65 for any known radial/relative velocity component as may have been previously determined by element 63.

The decoding of the angular coordinates of element 66 is relatively straightforward. First, correction is made to the measured constant phase for any constants introduced by the base signals (element 77). Such constants might result from the use of a pair of base signals rotated in phase by a constant $\chi$ from base signals as defined having symmetry and anti-symmetry properties, respectively (Property IV). Also, the base signals used in the processing sequencer 23 may contribute constant phase modifications to the measured member signal measured phases.

If a single angular coordinate is encoded in each member signal, only the measured phase need be associated with the angular coordinate via the known code imposed by the phase lens according to the present invention. Where more than one angular coordinate is encoded in each member signal, a somewhat more complex, but simultaneous decoding scheme is employed as described in the echo location embodiment shown in FIG. 7 of my referenced U.S. patent. In this case at least one angular coordinate must be encoded differently in different member signals. Also, the codes used must be independent and at least sufficient in number to permit a simultaneous solution for the angular coordinates. If there are redundant codes, a least squares solution can be applied.

The following exemplary circumstance is illustrative of a situation where more than one encoded angular coordinate is present. Assume that for two member signals which constitute a component signal, the measured constant phases $\theta_{oo}$ and $\theta_{1o}$ are determined. The two angular coordinates which are encoded are $\phi_o$ and $\phi_1$.

The constant phase encoding for $\phi_o$ will be taken as $\phi_o/h_o$ for both member signals, where $h_o$ is taken as a known constant. For $\phi_1$ on the other hand, the encoding will be $\phi_1/h_1$ for the first member signal and $\phi_1/h_2$ for the second one, where $h_1$ and $h_2$ are known constants.

Now, the measurements $\theta_{oo}$ and $\theta_{1o}$ may be related to $\phi_o$ and $\phi_1$, by the simply developed set of equations:

$$\theta_{oo} = \frac{\phi_o}{h_o} + \frac{\phi_1}{h_1} \tag{4}$$

$$\theta_{1o} = \frac{\phi_o}{h_o} + \frac{\phi_1}{h_2}$$

Simultaneous solution of equations (4) gives:

$$\phi_o = \frac{h_o h_1 \theta_{oo} - h_o h_2 \theta_{1o}}{h_1 - h_2} \tag{5}$$

$$\phi_1 = \frac{h_1 h_2 (\theta_{1o} - \theta_{oo})}{h_1 - h_2}$$

which is the desired simultaneous decoding.

The embodiment of FIG. 2 has been set forth in generalized terms since in navigation applications the present invention may be practiced when either the receiver 22 or the transmitter 20 is at a known location. Further, with the present invention, the component signal may be sent off in response to interrogation or at regular intervals. Also, the nature of the particular signals sent may be either acoustic or electromagnetic (including optical). Further, the same or other transmitters may be used to produce other component signals concurrently, and that these other component signals can be received and processed in an analogous manner to give still other estimates of navigational information.

Since viable navigation systems of this type (as described by FIG. 2) may operate according to any or all of the possibilities cited above according to the principles already set forth, a specific illustration of one alternative from the foregoing embodiments is given to help in understanding the present invention.

Figure 7:
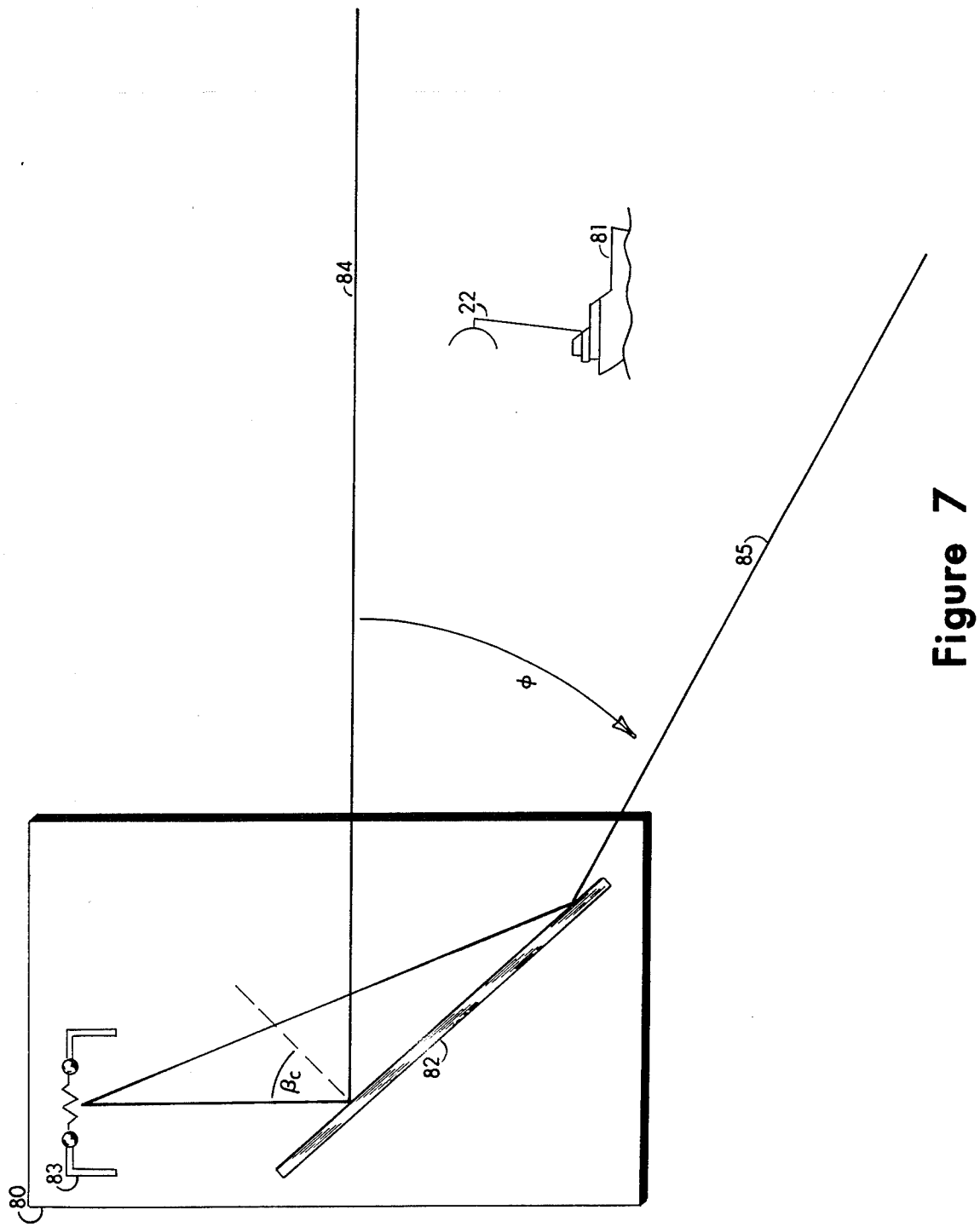
FIG. 7 shows an elementary electromagnetic area navigation system having a single base station.

FIG. 7 shows an elementary area navigation system having a single base station 80 at a known location. Receiver 22 onboard mobile platform (i.e. an aircraft, ship or other vehicle or vessel) 81 is able to establish bearing angle $\phi$, radial range, and radial velocity with respect to this base station. The navigation area is defined by two limits, the first comprising a line 84 of zero phase distortion in which the reflection is precisely at the critical angle, a second line 85 being defined by the effective physical limit of a reflector 82. Between limiting lines 84 and 85 there is a constant phase encoding $\theta_o$ that varies with the bearing angle $\phi$.

The encoding of a distinct phase according to the bearing angle $\phi$ is established by reflective means 82, the critical angle for the particular reflective material being $\beta_c$. A broad band source 83 of pulsed electromagnetic radiation is required. Such a source for signals having frequency bandwidth may be designed employing principles analogous to the Travitron developed by Ikor, Inc., of Burlington, Mass., which was reported by the New Scientist, p. 285, Aug. 6, 1970.

Figure 8:
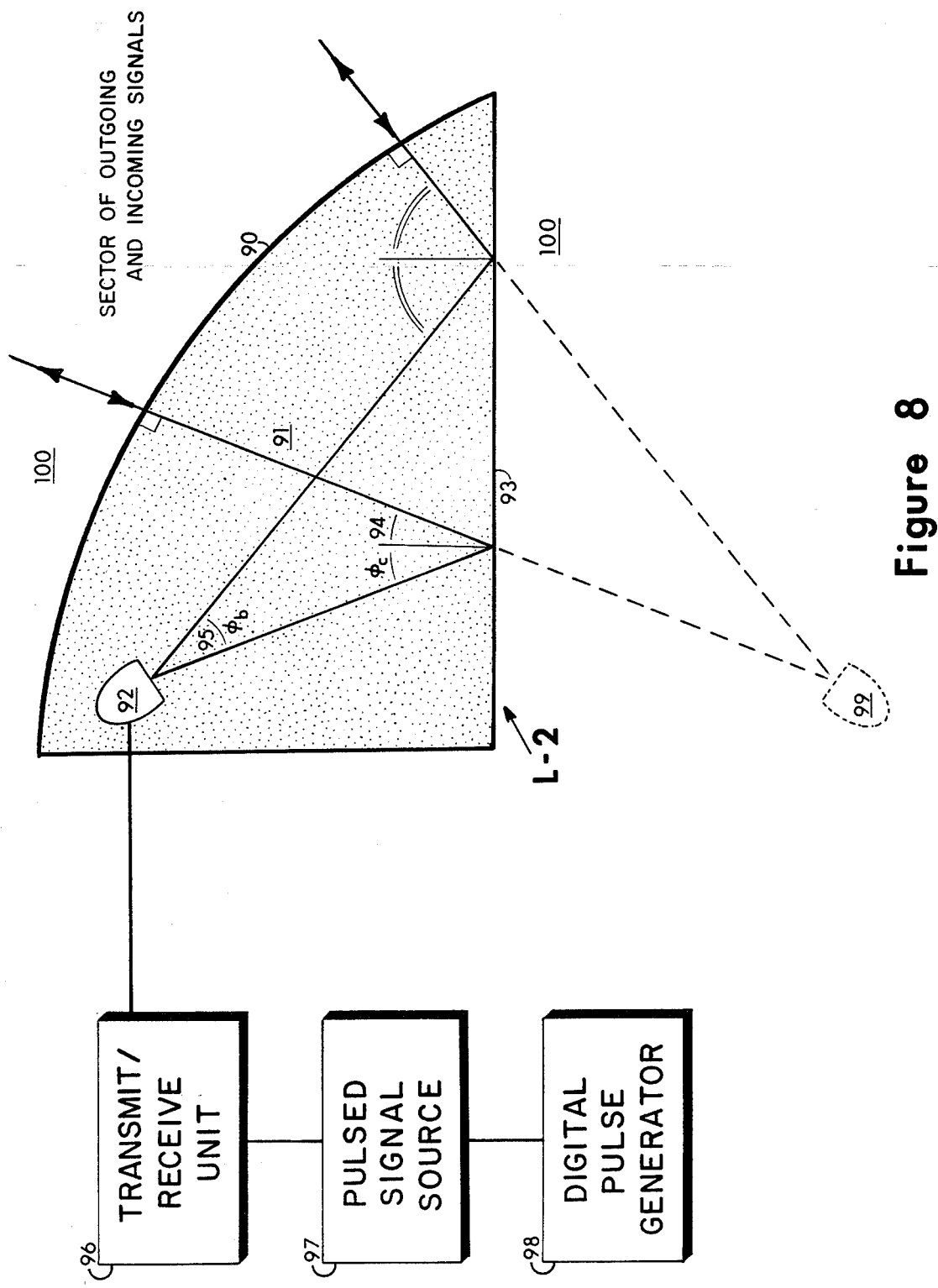
FIG. 8 shows a phase lens for dispersive encoding of directional information using post-critical angle reflection of electromagnetic signals.

A more detailed embodiment of the reflective phase encoding lens of FIG. 7 is shown as lens L-2 in FIG. 8. In principle the lens apparatus L-2 is rather similar to the phase lens of FIG. 4 except that now the encoding is accomplished in the transmitted signal rather than in the received signal. The medium is air or space, and the signals are electromagnetic rather than acoustic. Referring to FIG. 8, a solid structure 90 constructed of a paraffin or paraffin-like material 91, for example Stycase TPM 4 Cast Resin (available from Emerson and Cuming, Inc. of Canton, Mass.), surrounds a transmitter 92. The lower paraffin material boundary is precisely flat so as to constitute a specular reflecting surface 93.

Note that a boundary between air 100 and a dielectric material is needed rather than between air and some conducting material so that a critical angle may be defined. As a practical matter, a hard shell (not shown) of material such as Ecco Foam P. P. Series closed cell plastic sheeting (also available from Emerson and Cuming, Inc. of Canton, Mass.) can surround the paraffin material 91 for protection. The shell thickness should be thin compared to the wavelengths of the electromagnetic radiation.

The relative dielectric constants for air and a typical paraffin material are taken respectively as 1.0 and 2.1 according to Von Hippel, *Dielectric Materials and Applications,* M.I.T. Press, p. 438, 1954. Hence the critical angle 94 denoted by $\phi_c$ in this case is about 28.4°. A circularly polarized spiral antenna (as for example the Transco type RHAW, available from Transco Products, Inc. 4241 N. Glencoe Avenue, Venice, Calif. 90291) may, for example, be the transmitter 92 and for some applications may also serve as the receiver as well. This antenna operates in the frequency range from 0.5 to 18 Ghz and has a beam width 95 denoted by $\phi_b$, as defined by the 3 db level, of 25°.

A transmit/receive unit 96 is connected to transmitter 92 to allow the apparatus to be used both as a transmitter and a receiver. A suitable unit 96 may be purchased from Raytheon, Co. Microwave and Power Tube Division, Fondry Avenue, Waltham, Mass. 02154. A pulsed signal source 97, such as a Model PH 40K modified for 2.5–10 Ghz. available from EPSCO Microwave, Inc., 411 Providence Highway, Westwood, Mass. 02090, is used to provide unit 96 and transmitter 92 with pulses from a digital pulse generator 98, for example a Motorola 6800 Microprocessor (from Motorola, Inc., 8201 E. McDowell Rd., P.O. Box 1417, Scottsdale, Ariz. 85252). Using the microprocessor, a Klauder waveform $k_1(t)$ having a frequency band between 2.5 and 10 Ghz may be produced thus giving a mode of operation quite analogous to the acoustic case previously described.

The shape of the curved surface of the paraffin material 90, where signals exit or enter, should be a portion of a sphere that has its center at the virtual image position 99 of transmitter 92. Since all signals would then cross the paraffin-air boundary at normal incidence, no bending effects caused by Snell's law would be introduced. It is also important that far field signals from the transmitter 92 be produced for reflection by the specular reflecting surface 93. This can be assured by placing the transmitter at least 15 cm measured normally from the specular reflecting surface 93. For such case the radius of the sphere describing the curved paraffin surface measures about 35 cm.

Phase encoding as a function of direction, or in this case bearing angle $\phi$ (FIG. 7), takes place over the entire 25° beam-width. The undistorted Klauder signal $k_1(t)$ is reflected at the critical angle $\phi_c$, but all other bearing angles have a characteristic constant phase shift. In the case where the apparatus is used both to transmit and receive signals, all phase shifts are doubled since two postcritical angle reflections are applied. For this case it is also important to note that the signals reflected or scattered back to the transmitter from the paraffin-air interfaces arrive well in advance of signals from the much more distant objects that are being tracked and so may be deleted, if desired, by appropriate time gating.

Finally, there may remain some ambiguity about the signal trajectory which would be dependent on an elevation angle measured in a plane parallel to the specular reflecting surface 93. Similar ambiguity was inherent also in the apparatus of FIG. 4 and is resolved using other information components or using techniques which encode more than one angular coordinate as we have described.

Figure 9:
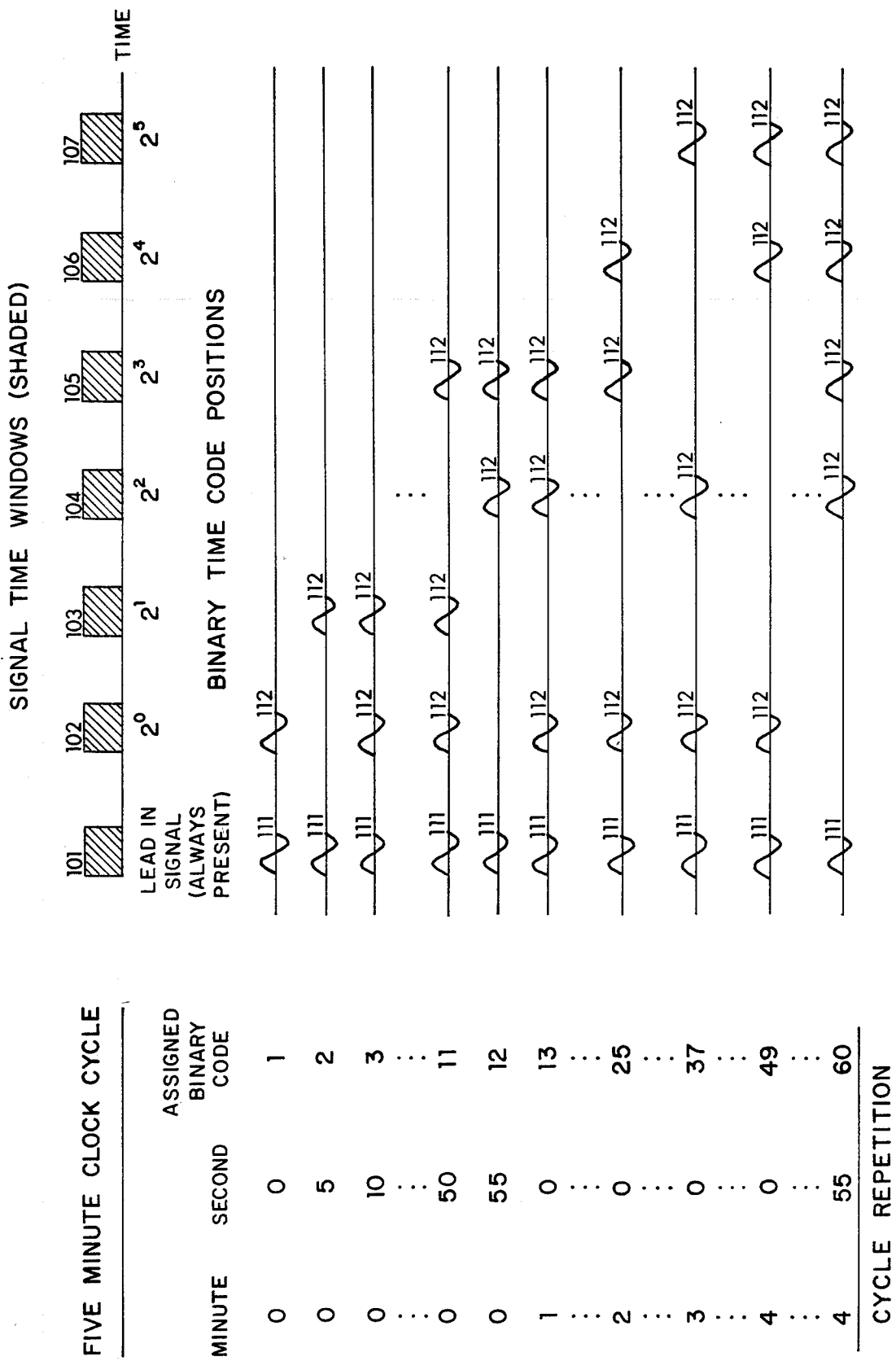
FIG. 9 shows schematically binary encoded member signals at known intervals for establishing time references.

Source 83 of FIG. 7 sends binary encoded pulse trains of member signals which repeat on a five minute clock cycle that is precisely controlled. The pulse sequences are sent at five-second intervals according to the code shown in FIG. 9. Seven time slots or windows are defined to apply for each pulse train sequence. The first read-in or clocking window 101 is always occupied by a pulse 111. The other time slots 102 through 107 represent successive powers of two from $2^0$ to $2^5$. The absence of a pulse in any slot represents a 0 in the corresponding position of the binary code. The presence of a pulse 112 represents a 1. Thus for example, at the line representing a time of two minutes, zero seconds of the five minute clock cycle the decimal representation of the assigned binary code is 25 and is represented by pulses (i.e. ones) in slots 101, 102, 105, 106 and the absence of pulses in slots 103, 104, and 107 to yield the code sequence 1100110 which, on inversion to customary numerical order and removal of the lead-in one, yields the equivalent binary number 11001. Note that the time of member signal initiation can be determined by simple recognition of the binary code. If a mobile platform remains stationary for several intervals at a known location, sufficient information will be received to calibrate a relatively low quality (and correspondingly inexpensive) time standard. With such a calibration achieved, the member signal initiation times are subsequently known.

Each of the component signal trains consists of no less than two member signals, and each signal is of a nature previously described (Properties I through IV). An appropriate frequency band in the case of electromagnetic near shore navigation might be 100–500 mhz. The system shown in FIGS. 7 and 9 thus requires no interrogation of the transmitter and can provide redundant navigational information by the conventional range-range approach, should there be additional base stations. In a system of the type shown in FIG. 7, as has been discussed above, the processing sequencer of FIG. 5 and the navigational information estimator of FIG. 6 would, of course be used to process signals received through the phase lens L-2 of FIG. 8.

From the foregoing description alternative implementations of the generalized embodiment of FIG. 2 using transmitter interrogations, or having known receiver locations and mobile transmitters, or employing only the encoding of angular coordinates will become readily apparent to those skilled in the art.

Again, it is important to emphasize that methods employing phase encoded angular coordinates according to the present invention may be used with conventional approaches such as the range-range operation, where more than one range determination may be made, and that standard statistical procedures for combining and upgrading the accuracy of redundant measurements may be employed.

It is useful at this point to relate features of the present invention to the considerations presented in the background for the invention. First, although member signals are pulse-like, they still are of sufficient duration to benefit from correlation detection, but also to suffer from Doppler distortions. Hence, a phase invariant correlation and detection scheme which complements the signal design is employed. If velocity information is desired more than one member signal is required. While sequences of member signals provide good redundancy and signal-to-noise ratio advantage, their very duration limits the ability to resolve changes in the relative velocity if this too is changing.

The defined class of member signals and signals which can be processed to be member signals have a remarkable ability to bear angular coordinate information as a distortion-resistant phase encoding. Several important practical advantages accrue to this invention owing to this ability and two particularly sophisticated extensions of the basic generalized embodiment of FIG. 2 will be described below.

Certain practical matters first should be taken into consideration. A rather standard approach to developing angular coordinate information in the prior art is to scan in the sense of the angular coordinate with a narrow beam transmitter, as in the case of a conventional radar system. Use of the narrow signal beam allows great concentration of signal energy, and has consequent advantages in noisy environments. One disadvantage, however, is that the time duration of the scanning cycle may leave portions of the navigation area without signal coverage for unacceptable time periods.

The system of the present invention is omnidirectional or at least broad beam by nature. Any diminution of signal level accompanying this feature may be overcome by frequent repetition of the signal patterns over time and the development of statistical models relating the information from one time to the next. In fact, the work of R. E. Kalman as reported in the Journal of Basic Engineering (ASME Transactions), Vol. 82, Pages 35-45, 1960, and the subsequent work on Kalman filters by others offers an ideal analytical vehicle to update the navigation information display 67 of FIG. 6. The navigation system described herein would at no time leave the navigation area without signal coverage for any significant time period.

Also, the ability to label the signal transmission paths with angular coordinates will solve an important problem occurring in long range navigation systems that use either electromagnetic or acoustic signals. For electromagnetic signals the skywave or ionospheric reflection sometimes may not be readily distinguished from directly transmitted signals. Submarine navigation systems similarly have multipath signal arrivals caused by reflections from the surface and bottom of the sea, which similarly may not be conveniently distinguishable from direct transmission paths. With the present invention, direct signal paths can be distinguished from secondary paths in terms of an angular coordinate, so that a new basis for identification of the direct signal is developed.

It follows from the ability to label signal transmission paths with angular coordinates, that a mobile platform such as shown in FIG. 7, once positioned, may position other mobile platforms relative to itself from their reflected signals or echoes. The transmitter and mobile platform carrying the receiver being at known locations constitute an echo location system.

Finally, one must consider the possibility that phase distortions may be impressed into the member signals by properties of the signal propagation medium itself. The presence of such distortions may not necessarily be anticipated or even recognized.

An excellent case in point involves the use of water as a propagation medium for acoustic signals centered around the frequency 1.2 mhz. Such transmissions are often used as small scale simulations of radar and microwave systems.

An experimental study using the techniques of this invention will be described below and documents and measures the hitherto undetected phase distortion or dispersive property of water at the cited frequency.

Figure 10:
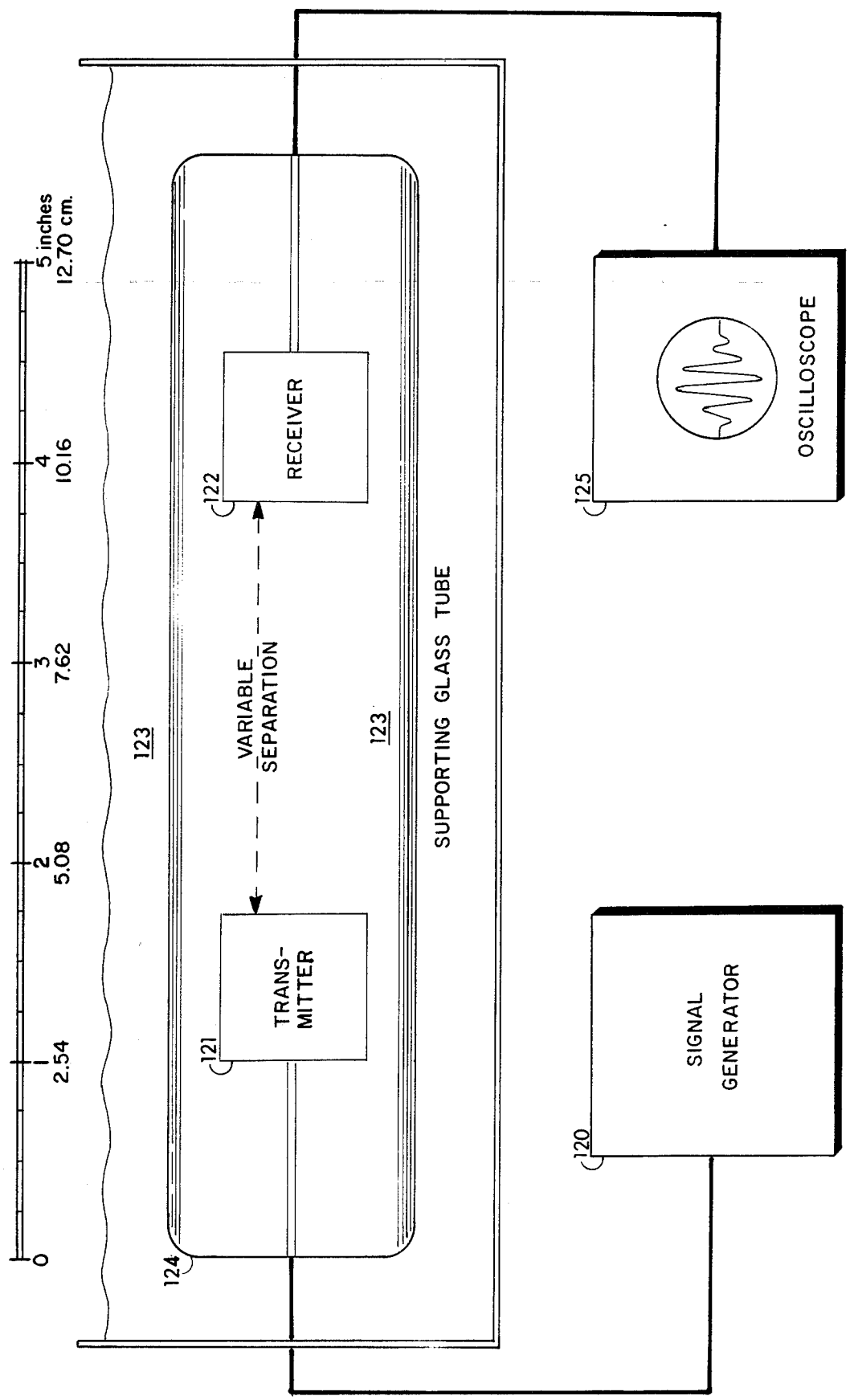
FIG. 10 shows an experimental apparatus used to characterize the phase distortion caused by the dispersive properties of water at 1.2 1hz.
Figure 11:
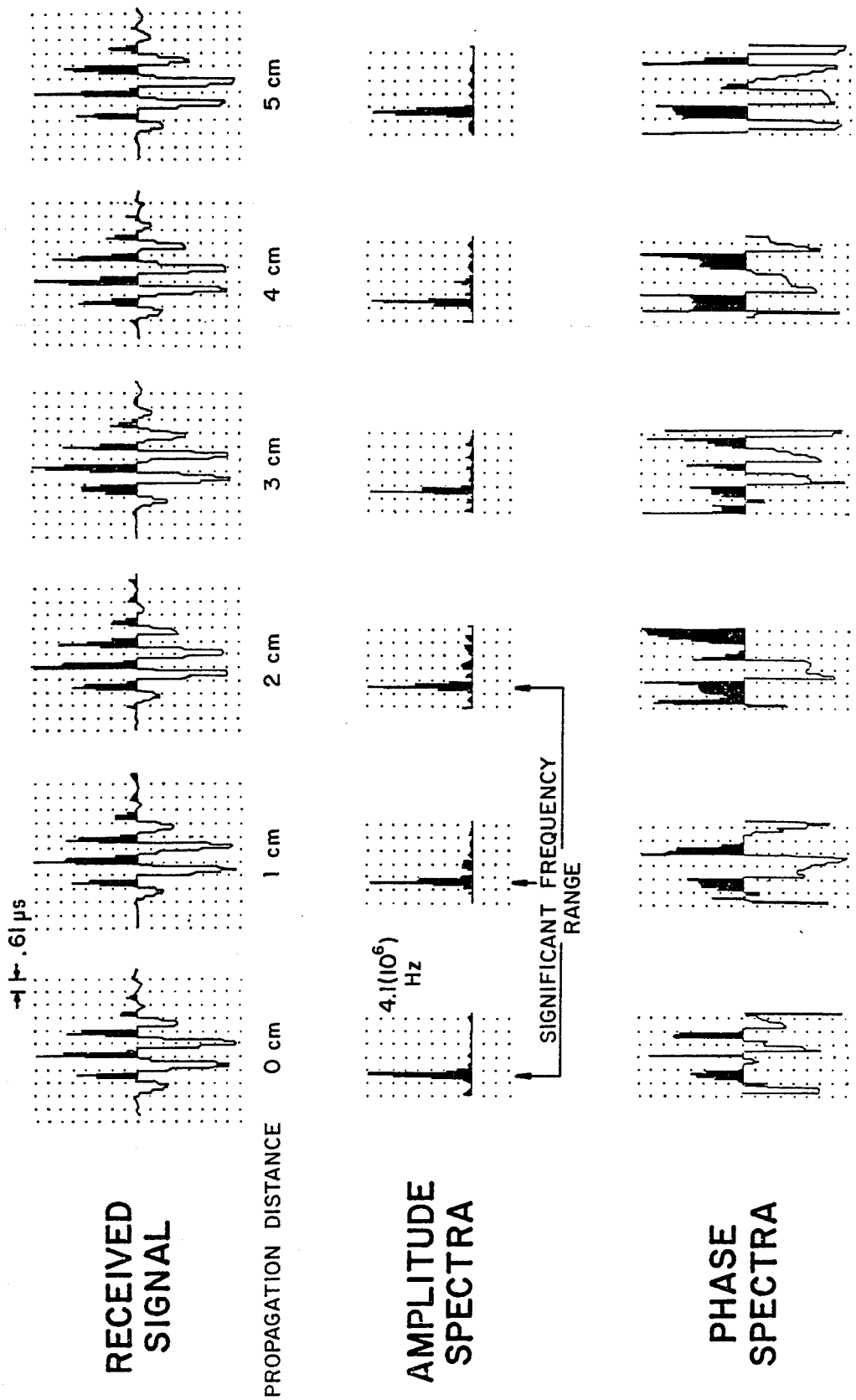
FIGS. 11 and 11a show digitized received member signals for the apparatus of FIG. 10, after transmission through water, and their frequency analyses.
Figure 11A:
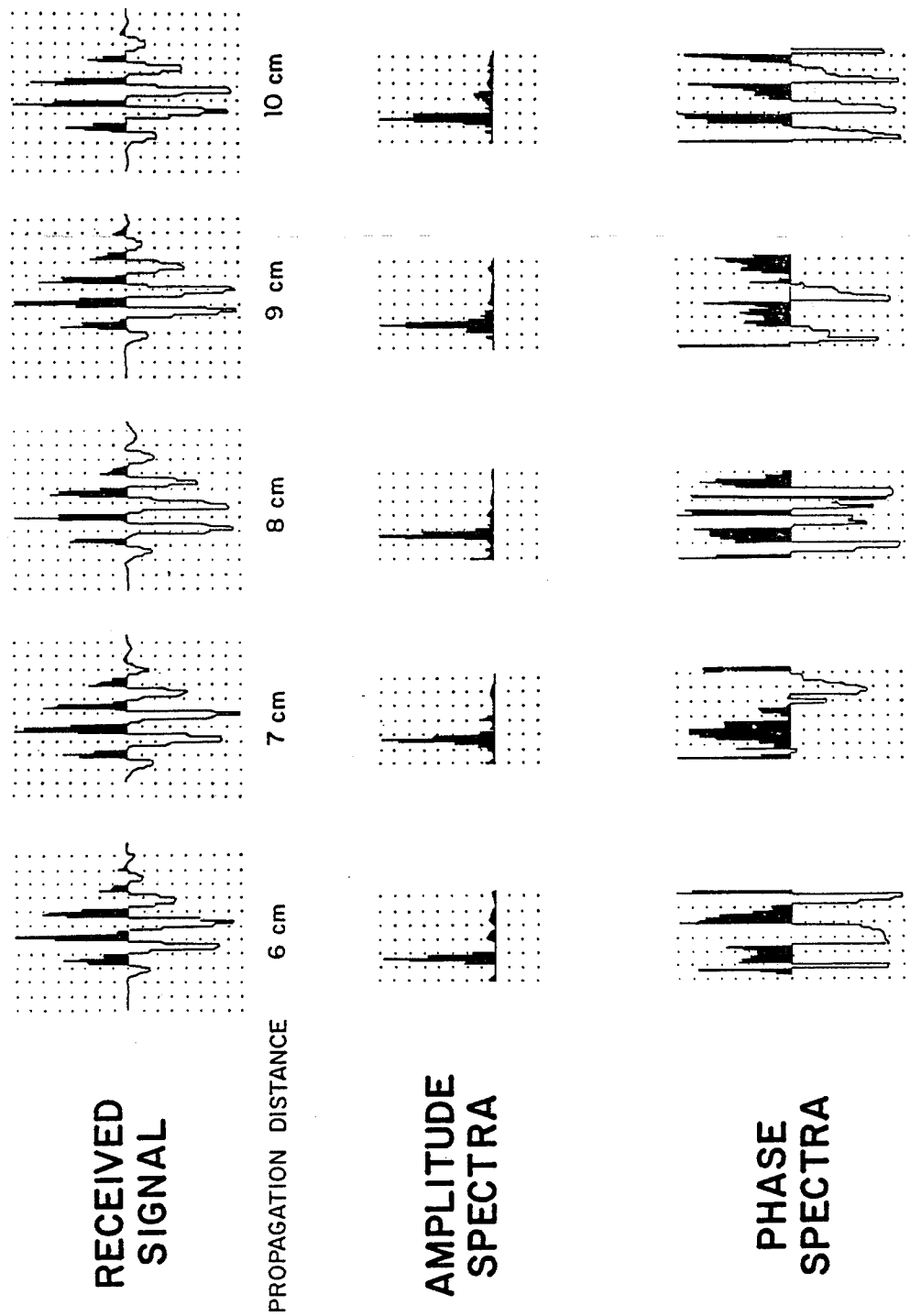

In this study, the constant phase term, which will be taken to characterize the phase effect of water as a dispersive transmission medium, was sought for the frequency band 0.95-1.45 mhz (roughly centered about 1.2 mhz). For the range of water transmission paths between two and seven centimeters in length, the constant phase distortion was estimated to be 16.7°/cm. FIGS. 10, 11 and 12 describe this particular study.

FIG. 10 shows a schematic arrangement of the apparatus. A Datapulse Model 101 signal generator 120 was used to drive a transmitting transducer 121 which sends a narrow acoustic beam to a receiving transducer 122 through water 123 in an immersed open glass tube 124. Transmitter 121 and receiver 122 were crystals having circular faces 1.905 centimeters in diameter, while the glass tube inner diameter measured 3.175 cm. Received waveforms were recorded on Polaroid photographs from a Tektronix type 561A oscilloscope 125. The wave forms were subsequently digitized at a sample interval of 0.122 $\mu$sec using a Wang calculator (not shown) with an interfaced digitizer (not shown).

FIG. 11 shows plots of the digitized received member signal waveforms for propagation distances from zero to ten centimeters through the water. Owing to the physical size of the transducer, only distances beyond 1.5 centimeters become representative of the far field signal transmissions. Also, owing to the transducer beam width, results beyond 7.5 centimeters may be expected to show tube sidewall interference effects.

In FIG. 11 amplitude and phase spectra are also shown for the received member signals. The origins for the phase spectral calculations are the time samples at or just before the member signal origins as would be determined following the processing sequence of FIG. 5. In this case, the correlation operations 52, 53 of FIG. 5 are performed with a Klauder signal base pair occupying the frequency band of 0.89 to 1.48 mhz and the origins selected are based on the peak times identified by element 57. Hence the phase spectra and the identification of characteristic constants over the significant frequency band represent the operations of element 59. The simple behavior of the phase spectra over the significant frequencies which results from appropriate choice of the member signal origins are to be noted.

In FIG. 12 the detected constant phases as calculated from the phase spectra over the band of significant frequencies (FIG. 11 and element 59 of FIG. 5) are plotted against the propagation distance, as are the constant phases computed according to element 58 of FIG. 5. The two calculations produce remarkably similar results, which imply a simple linear relationship 130 between the constant phase distortion (imparted by the water) and the propagation path length. As stated earlier, the slope of this relationship is estimated to be 16.7° of constant phase rotation for each centimeter of travel.

Hence, if signal phase distortions are present in the propagation medium, as described, the following description provides an embodiment for a navigation system which can measure such distortions and correct for them accordingly. The essentials for this embodiment have much in common with the method employed to encode more than one angular coordinate in a component signal.

For this embodiment the phase distortions imparted by the medium are treated as one additional encoded angular coordinate. If sufficient redundancy is designed into the component signal, and a sufficient number of the encodings including the medium phase distortion are mathematically independent, then the medium phase distortion is developed as a part of the same simultaneous calculation for the angular coordinates. A specific illustration is given below to explain this general concept.

Assume that two member signals constitute the particular component signal, and that the measured constant phases after processing according to FIG. 3 are $\theta_{oo}$ and $\theta_{10}$. The single angular coordinate $\phi_o$ is phase encoded as $\phi_o/h_o$ in the first member signal and as $\phi_o/h_1$ in the second one. A medium induced phase distortion $\phi_m$ is present in both member signals which have travelled over the same path.

The following equations relate the measurements $\phi_{oo}$ and $\theta_{10}$ to the desired quantities $\phi_o$ and $\phi_m$:

$$\theta_{oo} = \frac{\phi_o}{h_o} + \phi_m \qquad (6)$$

$$\theta_{10} = \frac{\phi_o}{h_1} + \phi_m$$

Solving equations (6) gives the following separate values for $\phi_o$ and $\phi_m$:

$$\phi_o = \frac{h_o h_1 (\theta_{oo} - \theta_{1o})}{h_1 - h_o} \qquad (7)$$

$$\phi_m = \frac{h_1 \theta_{1o} - h_o \theta_{oo}}{h_1 - h_o}$$

When $\phi_m$ is calculated for many ranges, the phase distortion of the medium can be rather simply characterized. Alternatively, if $\phi_m$ is believed to relate to the range in a functionally known manner and range estimates are available, then the decoding equations can be reformulated to directly estimate the parameters of the functional relationship.

In sum, navigation systems which embody elements of the invention described herein offer several novel and highly desirable and useful alternatives for addressing the compromises which inevitably must be faced in developing area navigation systems.

The foregoing disclosure and description of the invention are illustrative and explanatory thereof, and various changes in the size, shape, materials, components, circuit elements, wiring connections and contacts, as well as in the details of the illustrated circuitry and construction may be made without departing from the spirit of the invention.

I claim:

1. A method of ascertaining navigational information for at least one mobile platform in terms of at least one angular coordinate by transmitting from at least one transmitter and receiving with at least one receiver at least one signal having a band of contiguous frequencies with no frequency missing over a defined frequency bandwidth, comprising the steps of:
   changing the shape of the signal by encoding a distinction in phase over plural ones of the band of contiguous frequencies in accordance with at least one angular coordinate of navigational information, while propagating the signal from the transmitter to the receiver;
   receiving the propagated signal,
   measuring the phase of the received signal, and
   decoding the angular coordinate from the encoded distinction in phase.

2. The method according to claim 1 wherein said measuring step includes determining the phase spectrum of the received signal.

3. The method of claim 1 wherein said step of encoding comprises:
   propagating the transmitted signal through a dispersive medium so that the degree of dispersion varies in accordance with the angular coordinate.

4. The method of claim 1, wherein said step of encoding comprises:
   reflecting the transmitted signal from a surface at an angle beyond the critical angle.

5. The method according to claim 1 wherein the propagation medium between the transmitter and the receiver introduces phase changes into signals propagating through the medium and including the additional steps of:
   forming at least one component signal comprised of at least two constituent signals;
   encoding the distinction in phase in accordance with the angular coordinate in at least one of the constituent signals, such encoding being independent of any phase changes introduced by the propagation medium and with the number of such independent encodings being greater than the number of angular coordinates;
   on receipt of the propagated signals, identifying within the received component signal the said constituent signals;
   measuring the phases of the identified constituent signals, and
   separating the phase changes introduced by the medium from the angularly encoded phase.

6. The method of claim 1, wherein the navigational information is ascertained in terms of two angular coordinates and including the steps of:
   forming at least one component signal comprised of two constituent signals;
   independently encoding the distinction in phase in accordance with each of the two angular coordinates in each of the two constituent signals while propagating the component signal;
   on receipt of the propagated component signal identifying the constituent signals within the received component signal;
   measuring the phases of the identified signals, and
   decoding angular coordinates from the measured phases and the independent encodings.

7. The method of claim 1 wherein the phase of the propagated signal is substantially constant over its frequency bandwidth.

8. The method of claim 7 wherein a portion of the distinction in phase of the signal which changes the signal shape is substantially constant over the frequency bandwidth of the signal.

9. The method of claim 1, wherein a portion of the distinction in phase of the signal which changes the signal shape is substantially constant over the frequency bandwidth of the signal.

10. The method of claim 9, wherein said step of encoding comprises:
propagating the transmitted signal through a dispersive medium in which the degree of dispersion varies in accordance with the angular coordinate.

11. The method of claim 9, wherein said step of encoding comprises:
reflecting the transmitted signal from a surface at an angle beyond the critical angle.

12. A method of ascertaining navigational information for at least one mobile platform in terms of relative velocity by transmitting from one transmitter and receiving with at least one receiver in a medium of known signal propagation velocity, at least one component signal, comprising the steps of:
forming each component signal comprised of at least two constituent signals each of which is initiated at a distinct instant of time different from the other by a predetermined time interval;
propagating the component signal from the transmitter;
receiving the component signal;
identifying the constituent signals within the received component signal;
measuring the time interval between the constituent signals; and
determining the relative velocity of the mobile platform from the relationship between the calculated time interval and the predetermined time interval and the known signal propagation velocity of the medium.

13. The method of claim 12, wherein the instants of time are predetermined, and further including the steps of:
ascertaining for the mobile unit navigational information in terms of distance by measuring the arrival time of at least one of the received constituent signals;
determining the constituent signal transit time from the measured arrival time and the predetermined instant of time of initiation;
correcting the transit time as a function of the determined relative velocity; and
determining the distance between the transmitter and the receiver from the corrected transit time and the known signal propagation velocity.

14. The method of claim 13, wherein a first one of the constituent signals has a frequency bandwidth and further including the steps of:
ascertaining for the mobile platform navigational information in terms of at least one angular coordinate by performing the steps of:
changing the shape of the first constituent signal while propagating the signal from the transmitter to the receiver by phase encoding a distinction in phase in accordance with at least one angular coordinate;
measuring phase for the identified first constituent signal; and
decoding the angular coordinate from the encoded distinction in phase.

15. The method of claim 14, wherein a first mobile platform of a plurality of mobile platforms performs said step of ascertaining navigational information to determine its location and further including the step of:
transmitting component signals from a second of the plurality of mobile platforms;
receiving at the first mobile platform component signals reflected by the second mobile platform;
ascertaining the position of the second mobile platform relative to the first mobile platform from the reflected component signals.

16. The method of claim 14, wherein said step of encoding comprises:
propagating the transmitted component signal through a dispersive medium in which the degree of dispersion varies in accordance with the angular coordinate.

17. The method of claim 14, wherein said step of encoding comprises:
reflecting the transmitted component signal from a surface at an angle beyond the critical angle.

18. The method according to claim 14, in which the polarization of each component signal is preselected, the constituent signals of each component signal are member signals formed as a weighted sum of a design base signal pair, in which the base signals of the base signal pair are substantially in quadrature and have the same smooth and substantially unimodal amplitude spectrum over a continuous band of freqencies, and further including the steps of:
selecting design base signal pairs for each component signal such that component signals are distinguishable from each other in accordance with the logical sum of their polarization character, frequency content, and member signal time interval pattern;
separating received component signals and forming replicas of the received signals;
cross-correlating the replicas with corresponding detection base signal pairs, thereby producing a pair of correlation component functions for each component signal, such detection base signal pairs having properties analogous to the design pairs, but with corresponding detection base signal pairs having a frequency band overlapping the band of the design base signal pairs at least in part for any frequency shift of the design base pair frequency band caused by the relative motion of the mobile platform;
forming for each received component signal a correlation amplitude function from term-by-term sums of the absolute values of the correlation component function pairs, the absolute values being raised to a like power not less than one, and raising said sums to a power greater than zero but less than one, and
identifying individual member signals from the maxima of the correlation amplitude function.

19. The method of claim 12, wherein a first one of the constituent signals has a frequency bandwidth and further including the step of:
ascertaining for the mobile platform navigational information in terms of at least one angular coordinate by performing the steps of:
changing the shape of the first constituent signal while propagating the signal from the transmitter to the receiver by phase encoding in the first signal a distinction in phase in accordance with at least one angular coordinate;
measuring the phase of the received, identified first constituent signal; and
decoding the angular coordinate from the encoded distinction in phase.

20. The method of claim 12, in which the polarization of each component signal is preselected, the constituent signals of each component signal are member signals formed as a weighted sum of a design base signal pair, in which the base signals of the base signal pair are substantially in quadrature and have the same smooth and substantially unimodal amplitude spectrum over a continuous band of frequencies, and further including the steps of:

selecting design base signal pairs for each component signal such that component signals are distinguishable from each other in accordance with the logical sum of their polarization character, frequency content, and member signal time interval pattern;

separating received component signals and forming replicas of the received signals;

cross-correlating the replicas with corresponding detection base signal pairs, thereby producing a pair of correlation component functions for each component signal, such detection base signal pairs having properties analogous to the design pairs, but with corresponding detection base signal pairs having a frequency band overlapping the band of the design base signal pairs at least in part for any frequency shift of the design base pair frequency band caused by the relative motion of the mobile platform;

forming for each received component signal a correlation amplitude function from term-by-term sums of the absolute values of the correlation component function pairs, the absolute values being raised to a like power not less than one, and raising said sums to a power greater than zero but less than one, and identifying individual member signals from the maxima of the correlation amplitude function.

21. A phase lens for use in conjunction with a transducer to identify the path of signals emitted or received by the transducer comprising:

a body of dispersive material, said body of dispersive material being located at a specific position with respect to a reference point of a polar co-ordinate system for the transducer, said body of dispersive material having radial dimensions, relative to the reference point for the transducer, which cause the dispersive material to impart, to a constant portion of the phase parameter of signals passing through said body, a characteristic identifying the path of the signal with respect to the transducer.

22. A phase lens for use in a medium in conjunction with a transducer having a known reference point to identify the path of signals emitted or received by the transducer, comprising:

a reflector, said reflector having a higher impedance to the signals emitted or received by the transducer than the medium;

said reflector being located at a position with respect to the known reference point on the transducer so that only signals which are reflected from said reflector at an angle greater than the critical angle for said reflector in the medium pass to or from the known reference point in the transducer.

23. The phase lens of claim 22 and further including:

shield means for substantially diverting all signal other than those which pass to or from the known reference point in the transducer and which are reflected by said reflector at angle greater than the critical angle for said reflector in the medium.

24. A method of obtaining a measure of the dispersion characteristic of a medium imparted as a shape distortion due to velocity variations with frequency to a signal by transmission through the medium, comprising the steps of:

transmitting and receiving at least one known member signal having initial constant phase, measuring the phase of said received member signal, determining the presence, if any, of constant phase in the received member signal, and forming, from any detected constant phase different from the initial constant phase of the at least one known member signal, a measure of the dispersion characteristic of the medium.

25. A method of obtaining a measure of the dispersion characteristic of a medium imparted as a shape distortion due to velocity variations with frequency to a signal by transmission through the medium, comprising the steps of:

transmitting and receiving at least one known signal having a frequency bandwidth, the transmitted signal being transformable by an operator into a known initial member signal with an initial constant phase, transforming the received signal, using the operator, into a received member signal, measuring the phase of the received member signal, determining the presence, if any, of constant phase in the received member signal, and forming, from any detected constant phase different form the initial constant phase of the transform of the known signal, a measure of the dispersion characteristic of the medium.

26. A method of transmitting encoded information, comprising the steps of:

transmitting and receiving at least one known member signal having a band of contiguous frequencies with no frequency missing over a defined frequency bandwidth and also having an initial constant phase, changing the shape of the signal by encoding the information as a distinction in phase in accordance with the information, receiving the propagated signal, measuring the phase of the received signal, and decoding the information from the encoded distinction in phase.

27. A method of transmitting encoded information, comprising the steps of:

transmitting and receiving at least one known signal having a band of contiguous frequencies with no frequency missing over a defined frequency bandwidth, changing the shape of the signal by encoding the information as a distinction in phase in accordance with the information, receiving the propagated signal, transforming the received signal using an operator which transforms the known signal into a member signal, measuring the phase of the received transformed signal, and decoding the information from the encoded distinction in phase.

28. A method of obtaining a measure of the dispersion characteristic of a medium imparted as a shape distortion due to velocity variations with frequency to a signal by transmission through the medium, comprising the steps of:

transmitting at least one known signal having:

(1) a frequency bandwidth,
(2) a known onset time; and
(3) a known initial constant phase as a part of a phase function referred to the onset time, receiving the transmitted signal;

measuring the onset time of the received signal;

determining the presence of any constant phase in the received signal referred to the received signal onset time;

measuring the difference, if any, in the constant phase portion of the transmitted and received signals referring to the onset time of each such signal;

forming from any measured difference in the constant phase part of the transmitted and received signals, referring to the onset time of each such signal, a measure of the dispersion characteristic of the medium.

* * * * *

UNITED STATES PATENT AND TRADEMARK OFFICE
CERTIFICATE OF CORRECTION

PATENT NO. : 4,564,841　　　　　　　　　　　　　　Page 1 of 2
DATED      : January 14, 1986
INVENTOR(S) : Norman S. Neidell It is certified that error appears in the above-identified patent and that said Letters Patent is hereby corrected as shown below:

In column 1, line 32 please delete "in" and insert --is--.

In column 3, line 15 please delete "$f(\omega), \omega_1 \leq |\omega| \leq_2.$"
    and insert -- $f(\omega), \omega_1 \leq |\omega| \leq \omega_2$. --

In column 3, line 23 please delete "of" and insert --or--.

In column 4, line 41 please delete "that" and insert --than--.

In column 5, line 18 please delete "1hz" and insert --mhz--.

In column 6, line 8 (formula) please delete "$k_0(t) = k_1(t) = o \text{ for } |t| \geq \alpha$"
    and insert $k_0(t) = k_1(t) = o \text{ for } |t| \geq \frac{\alpha}{2}$.

In column 11, line 67 (formula) please delete "$\phi_\infty = \frac{\phi_o}{h_o} + \frac{\phi_1}{h_1}$"
    and insert $\theta_\infty = \frac{\phi_o}{h_o} + \frac{\phi_1}{h_1}$.

In column 17, line 23 please delete "$\phi_{oo}$" and insert --$\theta_{oo}$--.

In column 21, line 62 please delete "signal" and insert
    --signals--.

UNITED STATES PATENT AND TRADEMARK OFFICE
CERTIFICATE OF CORRECTION

PATENT NO. : 4,564,841

DATED : January 14, 1986

INVENTOR(S) : Norman S. Neidell

It is certified that error appears in the above-identified patent and that said Letters Patent is hereby corrected as shown below:

In column 22, line 29 please delete "form" and insert -- from --.

Signed and Sealed this

Twenty-second Day of July 1986

[SEAL]

Attest:

DONALD J. QUIGG

Attesting Officer

Commissioner of Patents and Trademarks